(12) United States Patent
Lee et al.

(10) Patent No.: US 10,771,706 B2
(45) Date of Patent: Sep. 8, 2020

(54) METHOD AND ELECTRONIC DEVICE FOR FOCUS CONTROL

(71) Applicant: Samsung Electronics Co., Ltd, Suwon-si (KR)

(72) Inventors: Seung Han Lee, Suwon-si (KR); Jong Hoon Won, Suwon-si (KR); Pyo Jae Kim, Suwon-si (KR); Young Kwon Yoon, Seoul (KR); Jong Hyeok Chun, Hwaseong-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 35 days.

(21) Appl. No.: 15/946,383

(22) Filed: Apr. 5, 2018

(65) Prior Publication Data

US 2018/0295292 A1    Oct. 11, 2018

(30) Foreign Application Priority Data

Apr. 10, 2017    (KR) .................. 10-2017-0045831

(51) Int. Cl.
*H04N 5/232* (2006.01)
*H04N 5/225* (2006.01)
*H04N 5/247* (2006.01)

(52) U.S. Cl.
CPC ....... *H04N 5/23296* (2013.01); *H04N 5/2258* (2013.01); *H04N 5/23212* (2013.01); *H04N 5/23216* (2013.01); *H04N 5/23293* (2013.01); *H04N 5/247* (2013.01)

(58) Field of Classification Search
CPC ............. H04N 5/23296; H04N 5/2258; H04N 5/23212; H04N 5/23216; H04N 5/23293; H04N 5/247
See application file for complete search history.

(56) References Cited

U.S. PATENT DOCUMENTS

2003/0160886 A1    8/2003  Misawa et al.
2011/0234768 A1    9/2011  Pan
(Continued)

FOREIGN PATENT DOCUMENTS

JP    2001042207 A    2/2001

OTHER PUBLICATIONS

European Search Report dated Aug. 8, 2018 in connection with European Patent Application No. 18 16 6181, 11 pages.

*Primary Examiner* — Twyler L Haskins
*Assistant Examiner* — Fayez Bhuiyan

(57) ABSTRACT

An electronic device includes a camera, a memory storing first unit information and second unit information to be used to move a lens driving part, and a processor. The first unit information is configured such that the camera causes a first focus sharpness variation and the second unit information is configured such that the camera causes a second focus sharpness variation. The processor is configured to receive a signal for adjusting a focus associated with an external object by using the camera, to verify a state of the electronic device associated with the reception of the signal, to select corresponding unit information among the first unit information and the second unit information, based at least partly on the state, and to move the lens driving part depending on the corresponding unit information to adjust the focus associated with the external object.

19 Claims, 16 Drawing Sheets

(56) References Cited

U.S. PATENT DOCUMENTS

| | | | |
|---|---|---|---|
| 2012/0189293 A1* | 7/2012 | Cao | G03B 9/02 396/333 |
| 2013/0120641 A1* | 5/2013 | Nagaoka | H04N 5/23212 348/345 |
| 2015/0103223 A1 | 4/2015 | Park | |

* cited by examiner

METHOD AND ELECTRONIC DEVICE FOR FOCUS CONTROL

CROSS-REFERENCE TO RELATED APPLICATION(S)

This application is based on and claims priority under 35 U.S.C. § 119 to Korean Patent Application No. 10-2017-0045831 filed on Apr. 10, 2017, in the Korean Intellectual Property Office, the disclosure of which is incorporated by reference herein its entirety.

TECHNICAL FIELD

The present disclosure relates to focus control of a camera.

BACKGROUND

As information technologies have developed, a camera has evolved from a traditional film camera into a digital camera. The digital camera has been recently included in the portable electronic device such as a smartphone.

The digital camera may collect light incident from the outside, by using a lens, and may convert the collected light into an electrical signal by using an image sensor. The electrical signal may constitute image data and may be stored in a memory or may be output to a display.

In the above-described camera, the adjustment of a focus location is an important factor to be considered to obtain a high-quality image such as the sharpness of a subject. In this regard, the camera may provide a user interface for adjusting the focus location in response to a user input. A user may adjust the focus location based on the user interface. Since an electronic device having an optical system with a zoom function is thick, a method using a plurality of optical systems having different depths of focus has been proposed for the purpose of providing an appropriate zoom function while maintaining the slimness of the portable electronic device.

The above information is presented as background information only to assist with an understanding of the present disclosure. No determination has been made, and no assertion is made, as to whether any of the above might be applicable as prior art with regard to the present disclosure.

SUMMARY

In a camera using a plurality of optical systems, since the focus locations applied to a zoom function are different from each other, it has been troublesome to newly adjust the focus location, if the focus location of a specific optical system is adjusted and then another optical system is used.

Aspects of the present disclosure are to address at least the above-mentioned problems and/or disadvantages and to provide at least the advantages described below. Accordingly, certain embodiments according to the present disclosure to provide a focus control method that allows focus information (e.g., focal length or focus location) to be shared between a plurality of optical systems with regard to manual focus adjustment, and easily adjust the focus location by standardizing an adjustment scheme associated with a focus location with respect to a plurality of optical systems, and an electronic device supporting the same.

In accordance with some embodiments of the present disclosure, an electronic device is provided. The electronic device may include a first camera module including a first lens driving part configured to move by using a first unit, wherein the movement, which corresponds to the first unit of the first lens driving part causes a first focus sharpness variation, a second camera module including a second lens driving part configured to move by using a second unit, wherein the movement, which corresponds to the second unit, of the second lens driving part causes a second focus sharpness variation, a memory, and a processor, wherein the processor is configured to receive a request of an execution of a camera function, receive a signal for adjusting a focus associated with an external object by using the first camera module or the second camera module, in response to the request, adjust the first unit or the second unit such that a difference between the first focus sharpness variation and the second focus sharpness variation belongs within a specified range, and move the first lens driving part depending on the adjusted first unit or the second lens driving part depending on the adjusted second unit to adjust the focus associated with the external object.

In certain embodiments according to the present disclosure, an electronic device is provided. The electronic device may include a camera including a lens driving part, a memory configured to store first unit information and second unit information, which are to be used to move the lens driving part, wherein the first unit information is configured such that the camera causes a first focus sharpness variation and the second unit information is configured such that the camera causes a second focus sharpness variation, and a processor, wherein the processor is configured to receive a signal for adjusting a focus associated with an external object by using the camera, verify a state of the electronic device associated with the reception of the signal, select corresponding unit information among the first unit information and the second unit information, based at least partly on the state, and move the lens driving part depending on the corresponding unit information to adjust the focus associated with the external object.

In various embodiments according to the present disclosure, an electronic device is provided. The electronic device may include a display, a first camera module including a first lens module and a first lens driving part configured to move the first lens module in a first movement unit, a second camera module including a second lens module and a second lens driving part configured to move the second lens module in a second movement unit, and a processor electrically connected to the first camera module and the second camera module, wherein the processor is configured to receive a user input with respect to one or more external objects, in a state where the first camera module is activated, determine activation of the second camera module with respect to the one or more external objects, in response to the user input, and present a user interface controlled such that a difference between a first focus sharpness variation of the first camera module changed by a change of a focus of the first camera module and a second focus sharpness variation of the second camera module changed by a change of a focus of the second camera module belongs within a specified range, through the display based at least partly on the activation of the second camera module.

According to various embodiments of the present disclosure, in an operation of adjusting the focus location of a plurality of optical systems, various embodiments standardize a focus sharpness variation regardless of a type of an optical system, thereby adjusting a focus location based on the same operating feeling.

In various embodiments according to the present disclosure, the current focus location may be shared between a plurality of optical systems, and the focus location of the newly activated optical system coincides with the focus location of the previously operated optical system in an operation switching process between optical systems. Accordingly, the operation switch between optical systems may be naturally performed, and an image may be rapidly captured by reducing a time required to correct a focus location.

Besides, a variety of effects directly or indirectly understood through this disclosure may be provided.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
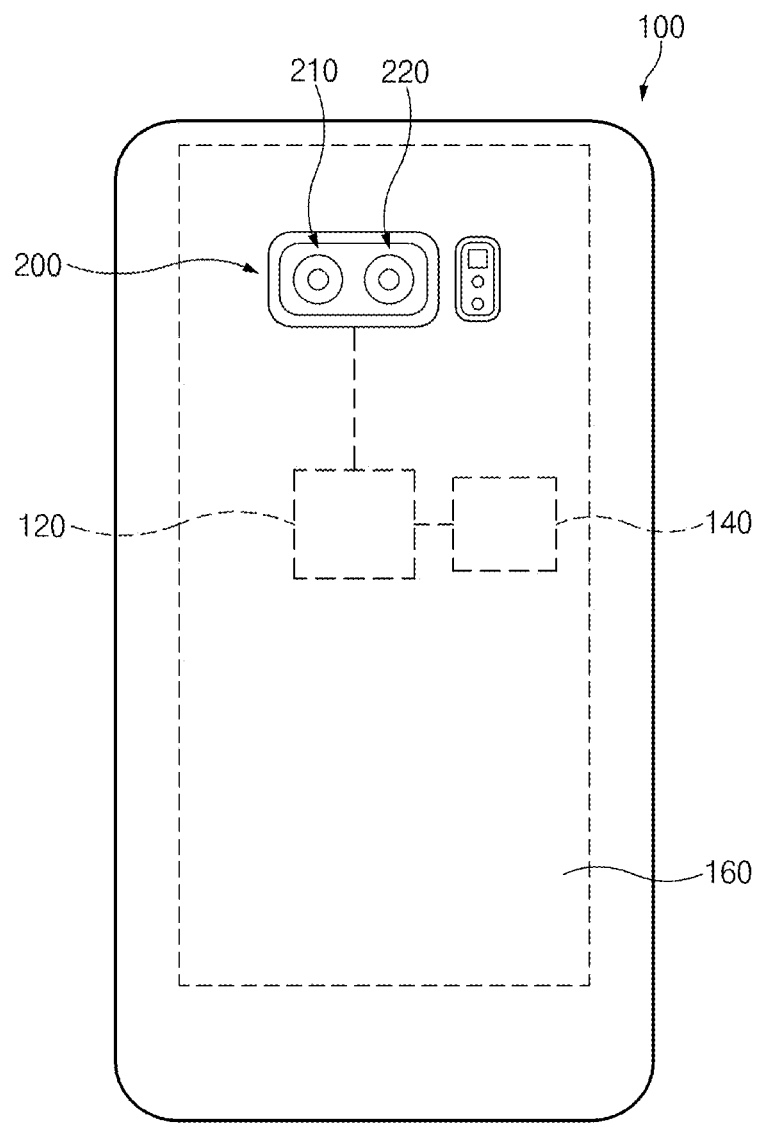
FIG. 1 illustrates an external view of an electronic device, according to various embodiments of the present disclosure.

FIGS. 1 through 15, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Various embodiments of the present disclosure may be described with reference to accompanying drawings. Accordingly, those of ordinary skill in the art will recognize that modification, equivalent, and/or alternative on the various embodiments described herein can be variously made without departing from the scope and spirit of the present disclosure. With regard to description of drawings, similar elements may be marked by similar reference numerals.

In the disclosure disclosed herein, the expressions "have", "may have", "include" and "comprise", or "may include" and "may comprise" used herein indicate existence of corresponding features (e.g., elements such as numeric values, functions, operations, or components) but do not exclude presence of additional features.

In the disclosure disclosed herein, the expressions "A or B", "at least one of A or/and B", or "one or more of A or/and B", and the like used herein may include any and all combinations of one or more of the associated listed items.

For example, the term "A or B", "at least one of A and B", or "at least one of A or B" may refer to all of the case (1) where at least one A is included, the case (2) where at least one B is included, or the case (3) where both of at least one A and at least one B are included.

The terms, such as "first", "second", and the like used herein may refer to various elements of various embodiments, but do not limit the elements. Furthermore, such terms may be used to distinguish one element from another element. For example, "a first user device" and "a second user device" may indicate different user devices regardless of the order or priority thereof. For example, "a first user device" and "a second user device" indicate different user devices.

It will be understood that when an element (e.g., a first element) is referred to as being "(operatively or communicatively) coupled with/to" or "connected to" another element (e.g., a second element), it may be directly coupled with/to or connected to the other element or an intervening element (e.g., a third element) may be present. In contrast, when an element (e.g., a first element) is referred to as being "directly coupled with/to" or "directly connected to" another element (e.g., a second element), it should be understood that there are no intervening element (e.g., a third element).

According to the situation, the expression "configured to" used herein may be used as, for example, the expression "suitable for", "having the capacity to", "designed to", "adapted to", "made to", or "capable of". The term "configured to" must not mean only "specifically designed to" in hardware. Instead, the expression "a device configured to" may mean that the device is "capable of" operating together with another device or other components. CPU, for example, a "processor configured to perform A, B, and C" may mean a dedicated processor (e.g., an embedded processor) for performing a corresponding operation or a generic-purpose processor (e.g., a central processing unit (CPU) or an application processor) which may perform corresponding operations by executing one or more software programs which are stored in a memory device.

Terms used in the present disclosure are used to describe specified embodiments and are not intended to limit the scope of the present disclosure. The terms of a singular form may include plural forms unless otherwise specified. Unless otherwise defined herein, all the terms used herein, which include technical or scientific terms, may have the same meaning that is generally understood by a person skilled in the art. It will be further understood that terms, which are defined in a dictionary and commonly used, should also be interpreted as is customary in the relevant related art and not in an idealized or overly formal detect unless expressly so defined herein in various embodiments of the present disclosure. In some cases, even if terms are terms which are defined in the specification, they may not be interpreted to exclude embodiments of the present disclosure.

An electronic device according to various embodiments of the present disclosure may include at least one of smartphones, tablet personal computers (PCs), mobile phones, video telephones, e-book readers, desktop PCs, laptop PCs, netbook computers, workstations, servers, personal digital assistants (PDAs), portable multimedia players (PMPs), Motion Picture Experts Group (MPEG-1 or MPEG-2) Audio Layer 3 (MP3) players, mobile medical devices, cameras, wearable devices (e.g., head-mounted-devices (HMDs), such as electronic glasses), an electronic apparel, electronic bracelets, electronic necklaces, electronic accessories, electronic tattoos, smart watches, and the like.

According to other embodiments, the electronic devices are home appliances. The home appliances may include at least one of, for example, televisions (TVs), digital versatile disc (DVD) players, audios, refrigerators, air conditioners, cleaners, ovens, microwave ovens, washing machines, air cleaners, set-top boxes, home automation control panels, security control panels, TV boxes (e.g., Samsung HomeSync™, Apple TV™, or Google TV™), game consoles (e.g., Xbox™ or PlayStation™), electronic dictionaries, electronic keys, camcorders, electronic picture frames, or the like.

According to some embodiments, the photographing apparatus may include at least one of medical devices (e.g., various portable medical measurement devices (e.g., a blood glucose monitoring device, a heartbeat measuring device, a blood pressure measuring device, a body temperature measuring device, and the like)), a magnetic resonance angiography (MRA), a magnetic resonance imaging (MRI), a computed tomography (CT), scanners, and ultrasonic devices), navigation devices, global positioning system (GPS) receivers, event data recorders (EDRs), flight data recorders (FDRs), vehicle infotainment devices, electronic equipment for vessels (e.g., navigation systems and gyrocompasses), avionics, security devices, head units for vehicles, industrial or home robots, automatic teller's machines (ATMs), points of sales (POSs), or internet of things (e.g., light bulbs, various sensors, electric or gas meters, sprinkler devices, fire alarms, thermostats, street lamps, toasters, exercise equipment, hot water tanks, heaters, boilers, and the like).

According to at least one embodiment, the electronic devices may include at least one of parts of furniture or buildings/structures, electronic boards, electronic signature receiving devices, projectors, or various measuring instruments (e.g., water meters, electricity meters, gas meters, or wave meters, and the like). In the various embodiments, the electronic device may be one of the above-described various devices or a combination thereof. An electronic device according to an embodiment may be a flexible device. Furthermore, an electronic device according to an embodiment may not be limited to the above-described electronic devices and may include other electronic devices and new electronic devices according to the development of technologies.

Hereinafter, an electronic device according to the various embodiments may be described with reference to the accompanying drawings. The term "user" used herein may refer to a person who uses an electronic device or may refer to a device (e.g., an artificial intelligence electronic device) that uses an electronic device.

FIG. 1 illustrates an external view of an electronic device, according to various embodiment of the present disclosure.

Referring to the non-limiting example of FIG. 1, an electronic device 100 according to some embodiments may include a camera 200 including a plurality of optical systems, a processor 120, a memory 140, and a display 160.

Additionally or alternatively, the electronic device 100 may include a housing surrounding the camera 200. The housing may include a first surface, a second surface (e.g., a surface opposite to the first surface), and a plurality of side surfaces interposed between the first surface and the second surface. The first surface of the housing may be opened and may be disposed such that at least part of the display 160 is exposed, and a hole may be formed on the second surface of the housing such that at least part of the camera 200 is exposed. The processor 120, the memory 140, and the like may be seated inside the housing. According to various embodiments, the electronic device 100 may further include a bracket, a printed circuit board, a battery, a communication circuit, an antenna, and the like disposed in the housing.

In some embodiments, camera 200 may include a plurality of optical systems (e.g., a plurality of camera modules). For example, the camera 200 may include a first camera module 210 and a second camera module 220. For example, the first camera module 210 may include a wide-angle camera. The second camera module 220 may include a telephoto camera. The first camera module 210 and the second camera module 220 may have different focus sharpness variations with respect to the same distance movement of a lens. For example, in the case where the first camera module 210 has a first focus sharpness variation with respect to a first lens movement distance, the second camera module 220 may have a second focus sharpness variation different from the first focus sharpness variation, with respect to the first lens movement distance. In the case where user inputs are the same as each other under control of the processor 120, the focus sharpness variations of the first camera module 210 and the second camera module 220 may be adjusted identically.

The memory 140 may store data or an application, which is associated with the operation of the electronic device 100. According to certain embodiments, the memory 140 may store a first application (e.g., a first camera application) associated with the control of the first camera module 210 and a second application (e.g., a second camera application) associated with the control of the second camera module 220. Alternatively, the memory 140 may support the sharing of the focus location of the first camera module 210 and the focus location of the second camera module 220 and may store an application that provides a user interface associated with focus location adjustment of the first camera module 210 and the second camera module 220. According to various embodiments, at least one of the first application and second application may support the focus location sharing of the first camera module 210 and the second camera module 220 and a user interface output function associated with focus location adjustment.

In the non-limiting example of FIG. 1, the display 160 may output at least one screen associated with the operation of the electronic device 100. For example, the display 160 may output an icon or a menu item associated with the operation of the camera 200. The display 160 may output at least one of a first user interface associated with the operation of the first camera module 210 and a second user interface associated with the operation of the second camera module 220. Each of the first user interface or the second user interface may include a menu or an icon for requesting the operations of different camera modules. For example, with regard to the operation of the first camera module 210, in a state where the first user interface associated with the operation of the first camera module 210 is output to the display 160, an icon or a menu associated with the operation of the second camera module 220 may be provided through the first user interface. Alternatively, the screen associated with the operation of the first camera module 210 may include an icon or a menu for activating the second camera module 220. If an icon or a menu associated with the operation of the second camera module 220 is selected, the first camera module 210 may be deactivated or may enter a sleep state or a standby state; after the second camera module 220 is activated, the second user interface associated with the operation of the second camera module 220 may be output to the display 160.

According to various embodiments, the display 160 may output a first focus adjustment object associated with the focus location adjustment of the first camera module 210 and a first zoom adjustment object associated with the zoom function adjustment of the first camera module 210. If the operation switching (e.g., the deactivation of the first camera module 210 and the activation of the second camera module 220) between optical systems in the electronic device 100 is performed, the display 160 may output a second focus adjustment object associated with the focus location adjustment of the second camera module 220 and a second zoom adjustment object associated with the zoom function adjustment of the second camera module 220. According to various embodiments, the first zoom adjustment object and the second zoom adjustment object may be output to the screen of the display 160 and may be output in the same form at the same location. The first zoom adjustment object and the second zoom adjustment object may be associated with the digital zoom adjustment function of the corresponding camera module.

As described above, if the specified camera module is activated, the electronic device 100 may output at least one of a focus adjustment object associated with the focus adjustment of the corresponding camera module and a zoom adjustment object associated with the zoom adjustment of the corresponding camera module, to the display 160. The display state of at least one of the focus adjustment object and the zoom adjustment object that are output to the display 160 may be removed (e.g., may not be displayed in the display 160) in response to a user input.

According to various embodiments, the first user interface output to the display 160 may include the first focus adjustment object associated with the focus adjustment of the first camera module 210. The second user interface output to the display 160 may include the second focus adjustment object associated with the focus adjustment of the second camera module 220. Since the focus locations of the first camera module 210 and the second camera module 220 are different from each other or the first camera module 210 and the second camera module 220 have different focus sharpness variations with respect to the same user input, the first focus adjustment object and the second focus adjustment object may have different sizes or lengths. According to various embodiments, the first user interface or the second user interface, which is output to the display 160, may further include an auxiliary object for focus fine adjustment. Alternatively, in the case where an external device (e.g., a remote controller capable of generating an input signal associated with the focus location adjustment, or the like) is connected with regard to the focus adjustment, the display 160 may output a screen associated with an external device connection state, a focus adjustment value input through the external device, a focus adjustment state, or the like.

The processor 120 may, in certain embodiments, process the generation or the transmission of a signal associated with the operation of the electronic device 100 according to an embodiment of the present disclosure. According to at least one embodiment, the processor 120 may execute at least one camera module included in the camera 200 in response to a user input or in response to the arrival of a specified schedule. According to some embodiments, the processor 120 may execute the first camera module 210 and the second camera module 220 at the same time, or the second camera module 220 may remain in a deactivation state (or standby state) while the first camera module 210 is being executed. Alternatively, while the second camera module 220 is being executed, the processor 120 may maintain the first camera module 210 in a deactivation state (or standby state).

While the first camera module 210 is activated and operated, the processor 120 according to various embodiments of the present disclosure may collect focus location information (e.g., manual focus location information or a manual focus value). The processor 120 may collect an input signal corresponding to the switching of the second camera module 220 and may activate the second camera module 220 in response to the collection. In this operation, while maintaining the first camera module 210 in a standby state or deactivating the first camera module 210, the processor 120 may apply the focus location information of the first camera module 210 to the second camera module 220. As such, the processor 120 may allow the focus location information of the first camera module 210 to be identically or similarly applied to the second camera module 220. In this regard, the memory 140 of the electronic device 100 may store and manage an arithmetic equation or a lookup table for matching the focus location information of the first camera module 210 and the focus location information of the second camera module 220. When an operation of switching (e.g., deactivating the first camera module 210 or transitioning the current state to a standby state and activating the second camera module 220) to the second camera module 220 is generated by the first camera module 210, the processor 120 may obtain the focus location information of the current state of the first camera module 210 and may perform an arithmetic operation for applying the focus location information to the second camera module 220. Alternatively, the processor 120 may verify parameters to be changed in the second camera module 220 or the first camera module 210, through the lookup table such that the current focus location of the first camera module 210 is the same as the focus location of the second camera module 220 or is similar to the focus location of the second camera module 220 within a specified range and may perform the focus location adjustment of the second camera module 220 depending on a verification value. According to various embodiments, when the first camera module 210 is activated, the processor 120 may maintain the second camera module 220 in a standby state or may deactivate the second camera module 220; when the second camera module 220 is activated, the processor 120 may maintain the first camera module 210 in a standby state or may deactivate the first camera module 210.

According to various embodiments, the processor 120 may output a user interface associated with the focus location adjustment of a camera module currently being executed, to the display 160. In this operation, the processor 120 may provide a touch UI such that the first camera module 210 or the second camera module 220 has a focus sharpness variation within the same or similar range with respect to the same touch distance.

As described above, the electronic device 100 according to certain embodiments of the present disclosure may include a plurality of camera modules (or optical systems) and may share the focus location of each of camera modules with each other, and thus may allow an image associated with the same focus location to be easily captured during the operation switching between camera modules. In addition, the electronic device 100 may provide the same operating feeling for the focus sharpness variations of the first camera module 210 and the second camera module 220 in a user interface associated with the focus location, to make the amount of focus sharpness variation for the user input operation uniform, thereby preventing the occurrence of the feeling of rejection or the sense of heterogeneity due to manual focus adjustment.

Figure 2:
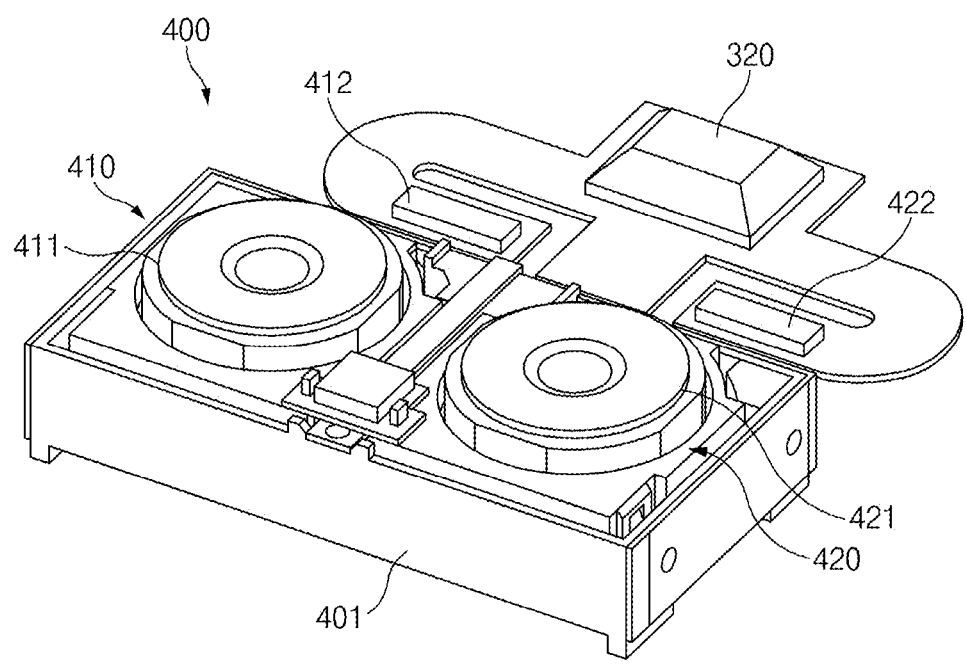
FIG. 2 illustrates a camera, according to certain embodiments of the present disclosure.

FIG. 2 illustrates a camera, according to certain embodiments of the present disclosure.

Referring to the non-limiting example of FIG. 2, a camera 400 according to at least one embodiment of the present disclosure may include a first camera module 410 (e.g., the first camera module 210), a second camera module 420 (e.g., the second camera module 220), a processor 320 (which, in certain embodiments, is processor 120), and a case 401 (which, in certain embodiments, is case 401).

The case 401 may include at least one or more sidewalls surrounding the first camera module 410 and the second camera module 420. The upper portion of the case 401 may be opened and may include a structure that fixes the first camera module 410 and the second camera module 420.

The first camera module 410 may include a first camera unit 411 and a first camera controller 412. For example, the first camera unit 411 may include at least one lens, and at least one of the at least one lens may perform vertical motion associated with the adjustment of the focus location. Alternatively, the first camera module 410 may include a lens barrel surrounding the at least one lens and may include a lens driving part (e.g., a hardware device adjusted by the focus adjustment object) in association with focus location adjustment. For example, the lens driving part may include a first focus adjustment module. Upon setting an auto focus function, the first focus adjustment module may support the auto focus function of the first camera module 410 depending on a specified setting value. Alternatively, upon operating the manual focus function of the first camera module 410, the first focus adjustment module may move the first camera unit 411 in a specified direction (e.g., vertical direction) as many as a specified distance, in response to a user input. According to an embodiment, the first focus adjustment module may include a coil and a magnet to move the lens included in the first camera unit 411 in the vertical direction. The first focus adjustment module may supply the current supplied from the first camera controller 412 to the coil; the first camera unit 411 may be moved in a specified direction (e.g., vertical direction) by the repulsive force between the coil to which a current is supplied and the magnet and thus a focus location may be changed.

The first camera controller 412 may control the driving of the first camera unit 411. For example, the first camera controller 412 may control the activation of the first camera unit 411, the focus location adjustment of the first camera unit 411, the image capture of the first camera unit 411, or the like, under control of the processor 320. The first camera controller 412 may receive the image captured from the first camera unit 411. The received image may be output through the display 160 connected to an electronic device or may be stored in the memory 140. According to an embodiment, the first camera controller 412 may calculate the movement distance of a lens associated with focus location change of the first camera unit 411, in response to an input signal input from an input unit (e.g., a touch screen, a touch pad, a physical button, a wheel button, or the like) connected to the electronic device 100. The first camera controller 412 may calculate the amount of current supplied to the coil of the first focus adjustment module in response to the calculated movement distance to supply the current to the first focus adjustment module. According to various embodiments, the amount of current to be supplied to the first focus adjustment module may be provided as a lookup table, depending on the focus location value to be changed in response to the user input and the changed focus location value and may be stored in the memory 140. The first camera controller 412 may process the manual focus adjustment of the first camera unit 411 with reference to the corresponding lookup table.

The second camera module 420 may include a second camera unit 421 and a second camera controller 422. For example, the second camera unit 421 may include at least one lens, an image sensor, or the like. The optical characteristic of the lens included in the second camera unit 421 may be designed to be different from the optical characteristic of the lens included in the first camera unit 411. For example, compared with the first camera unit 411, at least one lens of the second camera unit 421 may be designed to have a wide-angle or to capture a subject in a farther distance (telephoto characteristic). With regard to focus location adjustment, the lens included in the second camera unit 421 may move in a specified direction (e.g., vertical direction). Alternatively, with regard to the focus location adjustment, a barrel surrounding the lens included in the second camera unit 421 may move in a specified direction. In this regard, with regard to the movement of the lens in a specified direction, the second camera unit 421 may include a second focus adjustment module. The second focus adjustment module of the second camera unit 421 may operate to be substantially the same as or similar to the first focus adjustment module. For example, the second focus adjustment module may include a coil and a magnet and may move a structure including a lens in a specified direction by a current that the second camera controller 422 supplies, with regard to focus location movement. According to various embodiments, the movement distance characteristic of a lens of the second focus adjustment module included in the second camera unit 421 may be different from the movement distance characteristic of a lens of the first focus adjustment module, in association with the same input. For example, the value of a distance at which the lens of the first camera unit 411 is moved by the first current amount supplied to the first focus adjustment module may be different from the value of a distance at which the lens of the second camera unit 421 is moved by the first current amount supplied to the second focus adjustment module.

The processor 320 may receive a user input from an input unit (e.g., touch screen, wheel button, touch pad, or the like) and may adjust the focus location of the camera 400 in response to the received user input. For example, in a state where the first camera module 410 is activated, if a user input associated with focus location adjustment is received from the input unit, the processor 320 may transmit the corresponding input value (e.g., a value indicating a touch movement distance, a focus location, or the like) to the first camera controller 412. To cope with the issue, the first camera controller 412 may calculate a focus location to be changed in response to a user input and may adjust the focus location of the first camera unit 411 based at least partly on the calculated value. Alternatively, with reference to the memory 140, the first camera controller 412 may transmit a current value according to a user input to the first focus adjustment module of the first camera unit 411.

According to various embodiments, the processor 320 may deactivate the first camera module 410 and may activate the second camera module 420 in response to a user input. In this operation, the processor 320 may transmit the focus location value of the first camera module 410 to the second camera controller 422 of the second camera module 420. The second camera controller 422 may control the movement of the second camera unit 421 in response to the transmitted focus location value. Based at least partly on this, during the switching operation (e.g., an operation of activating the second camera module 420 upon operating the first camera module 410) of the camera module, the processor 320 may apply the focus location value of the first camera module 410 to the second camera module 420 to allow the second camera module 420 to have the same focus location.

Figure 3:
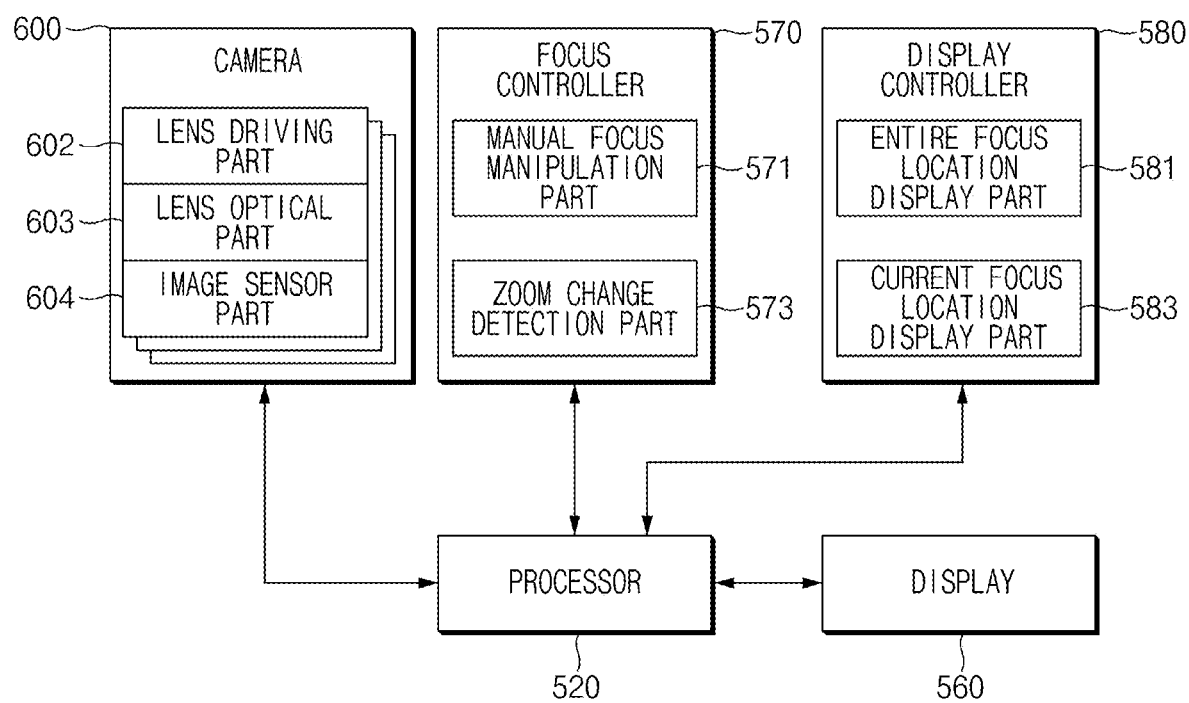
FIG. 3 illustrates, in block diagram format, a configuration of an electronic device, according to some embodiments of the present disclosure.

FIG. 3 illustrates, in block diagram format, a configuration of an electronic device, according to various embodiment of the present disclosure.

Referring to the non-limiting example of FIG. 3, the electronic device 100 according to some embodiments of the present disclosure may include a camera 600, a focus controller 570, a display controller 580, a processor 520 (e.g., the processor 120 or 320), and a display 560 (e.g., the display 160). The focus controller 570 may be provided as at least one hardware processor. Alternatively, after being provided as a software module, the focus controller 570 may be loaded to the memory 140, may be activated under control of the processor 520, and may perform a focus control operation of the camera 600. After being implemented with at least one hardware processor or a software module, the display controller 580 may be stored in the memory 140 and may be managed as a configuration for outputting a screen associated with the operation of the camera 600 to the display 560.

As described above, the camera 600 may include a plurality of optical systems. For example, the camera 600 may include a plurality of camera modules including a lens driving part 602 (or focus driving unit), a lens optical part 603, and an image sensor part 604. The lens driving part 602 may be provided for each camera module. For example, a first camera module may include a first lens driving part, and a second camera module may include a second lens driving part.

The lens driving part 602 may, in some embodiments, perform an operation associated with the focus adjustment of a camera module. For example, the lens driving part 602 may perform the movement of the focus lens included in the lens optical part 603. According to an embodiment, the lens driving part 602 may control the current supply to a coil, for the purpose of controlling the movement of a lens barrel including a lens in a focus adjustment direction. Alternatively, the lens driving part 602 may adjust the motion of a motor or a gear, for the purpose of controlling the motion of the barrel associated with the movement of the lens. In the case where a plurality of camera modules (e.g., the first camera module and the second camera module) are present, the camera modules may include lens driving parts (e.g., the first lens driving part and the second lens driving part), respectively.

The lens optical part 603 (e.g., the first camera unit 411 or the second camera unit 421) may include a structure, in which at least one lens is disposed, or at least one camera unit. For example, the lens optical part 603 may include a plurality of lenses, and at least one lens among a plurality of lens may be disposed to be capable of moving in a specified direction in association with focus adjustment. In the lens optical part 603, the number of lenses or the shape of the lens may be different depending on the characteristic of a camera module.

The image sensor part 604 may collect the light incident through the lens optical part 603. The image sensor part 604 may transmit the collected light to the processor 520 or a camera controller. In a camera structure in which the plurality of optical systems are disposed, after being integrated with one device, the image sensor part 604 may be partially used for image collection of each of camera modules. Alternatively, the image sensor part 604 may include a plurality of physically separated sensors, and each of the sensors may be used for the image collection of each of camera modules.

The focus controller 570 may include a manual focus manipulation part 571 and a zoom change detection unit 573. At least one of the manual focus manipulation part 571 and the zoom change detection unit 573 may be implemented with a software module or a hardware processor.

The manual focus manipulation part 571 may transmit a signal for manipulating the focus location of the lens optical part 603, to the lens driving part 602 in response to a user input. In this regard, the manual focus manipulation part 571 may calculate a focus location value to be changed in response to a user input and may transmit a change signal depending on the calculated value (e.g., a signal indicating the amount of current to be supplied to a coil) to be transmitted to the lens driving part 602, to the lens driving part 602.

If receiving the input signal from the zoom change detection unit 573, the manual focus manipulation part 571 may generate a zoom manipulation signal according to the reception of the input. The manual focus manipulation part 571 may control the zoom adjustment of the camera 600 based at least partly on the generated zoom manipulation signal. According to various embodiments, the manual focus manipulation part 571 may share the zoom states of a plurality of camera modules. For example, the manual focus manipulation part 571 may store and manage the zoom state value of the first camera module 410. If the second camera module 420 is activated after the operation of the first camera module 410 is interrupted or the first camera module 410 enters a standby state, the manual focus manipulation part 571 may adjust the second camera module 420 such that the zoom state of the second camera module 420 becomes the zoom state of the first camera module 410 that is previously operated. In this operation, the manual focus manipulation part 571 may adjust the zoom state of the second camera module 420 by using the stored and managed zoom state value.

The zoom change detection unit 573 may detect a user input associated with a zoom change. For example, the zoom change detection unit 573 may output a wheel button associated with the zoom change of the camera 600 or a touchscreen-based zoom adjustment object, to the display 560. If an input signal associated with the zoom change is collected, the zoom change detection unit 573 may transmit the corresponding input signal to the manual focus manipulation part 571.

The display controller 580 may include at least one of an entire focus location display part 581 (or a first display area) and a current focus location display part 583 (or a second display area). The at least one of the entire focus location display part 581 and the current focus location display part 583 may be implemented with a software module or a hardware processor.

The entire focus location display part 581 may display a stroke associated with the entire focus location of the camera module being currently executed. In this regard, the entire focus location display part 581 may display the focus stroke (the distance between the maximum point and the minimum point to which a lens is capable of being moved) of the camera module being executed. The current focus location display part 583 may output a focus adjustment object associated with the stroke display.

Figure 4:
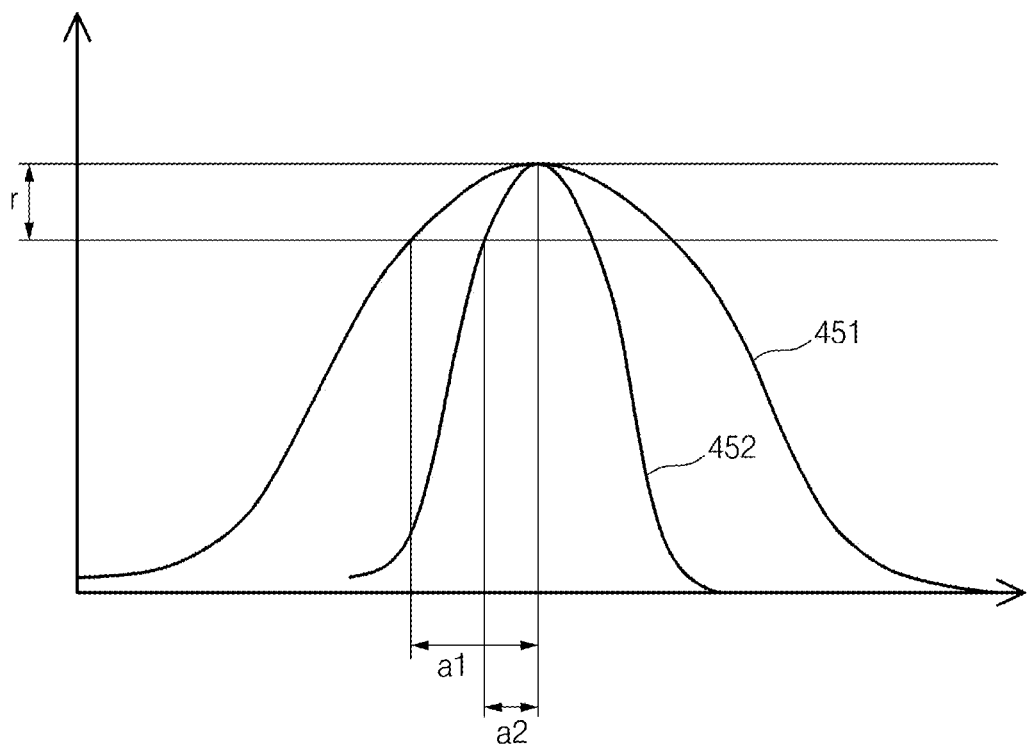
FIG. 4 illustrates focus sharpness change across optical systems having different focus sharpness variations, according to some embodiments of the present disclosure.
Figure 5:
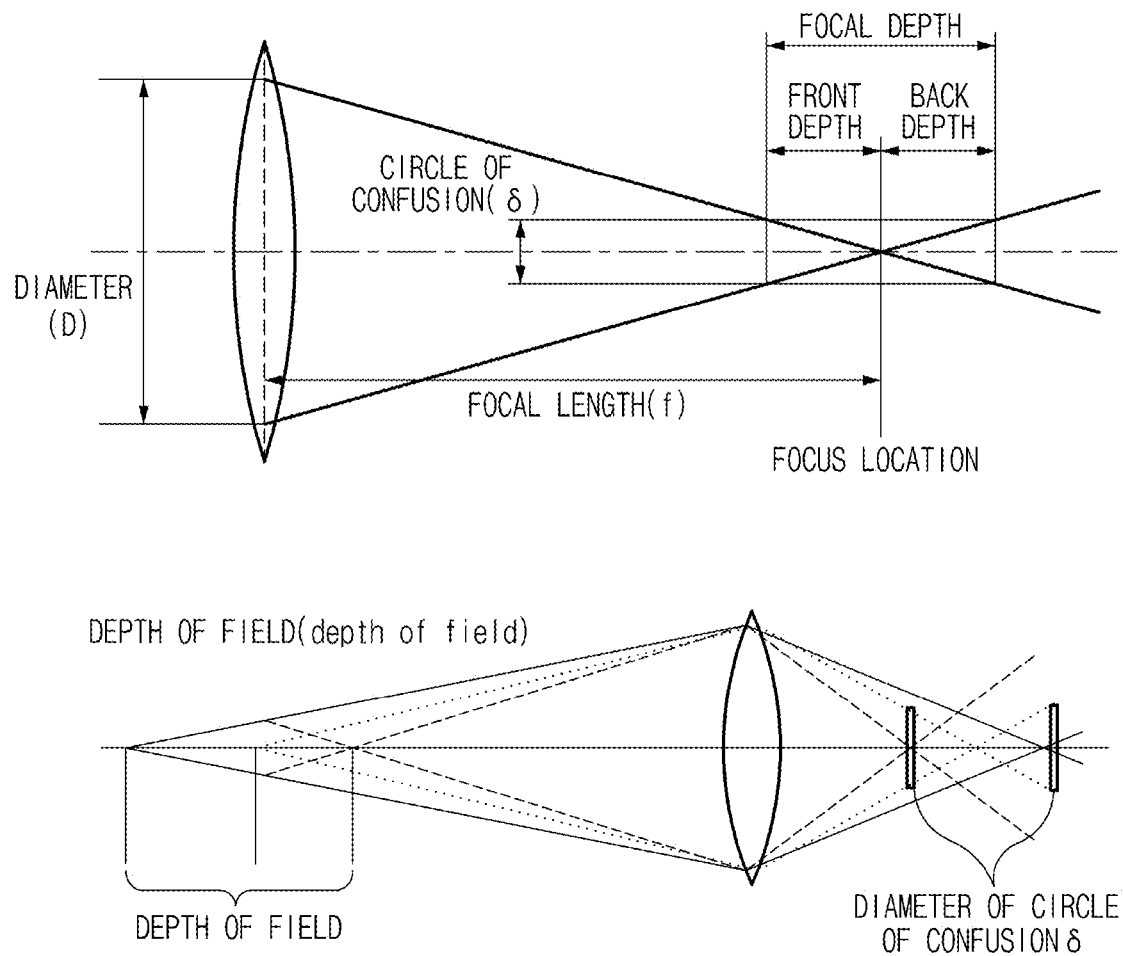
FIG. 5 illustrates depth change according to a focal length change, according to some embodiments of the present disclosure.

FIG. 4 illustrates focus sharpness change of optical systems in each of which a focus sharpness variation is different, according to some embodiment of the present disclosure. FIG. 5 illustrates depth change according to a focus location change, according to certain embodiments of the present disclosure.

In the non-limiting example of FIG. 4, the abscissa of the graph represents the location of the lens (the location of the focus), and the unit may be micrometers, millimeters, or the like. The ordinate represents the focus sharpness for a specific area in the image. The resolution change may occur depending on the focus sharpness, and the value of the focus sharpness may have the highest value at the location where the focus is matched.

Referring to FIG. 4, according to various embodiments, in the first camera module 410 (e.g., a wide-angle camera), the focus sharpness of the first camera module 410 may be changed depending on the lens location of the first camera module 210 or 410 (hereinafter, descriptions based on first camera module 410). Referring to FIG. 4, the focus sharpness of the first camera module 410 may vary depending on a first focus sharpness curve 451. Alternatively, in the second camera module 220 or 420 (hereinafter, descriptions based on the second camera module 420) (e.g., a telephoto camera), the focus sharpness of the second camera module 420 may be changed depending on the lens location of the corresponding second camera module 420. Referring to FIG. 4, the focus sharpness of the second camera module 420 may vary depending on a second focus sharpness curve 452.

A camera module according to one embodiment is represented in FIG. 4 as the height of the inflection point of the first focus sharpness curve 451 is the same as the height of inflection point of the second focus sharpness curve 452. However, embodiments of the present disclosure may not be limited thereto. For example, the height of inflection point of the first focus sharpness curve 451 may be formed to be lower than the height of inflection point of the second focus sharpness curve 452.

As described above, the abscissa encompasses the location of a lens. In the non-limiting example of FIG. 4, 'r' indicates focus sharpness. For the purpose of change to the same focus sharpness 'r', if it is assumed that a1 and a2 are the movement distances of a lens to be moved in each camera module for the same focus sharpness change, the processor 120, 320, or 520 (hereinafter, descriptions based on the processor 520) of the electronic device 100 may allow camera modules to have the same (or similar) focus sharpness change by applying the movement distances of the different lenses in response to an input (e.g., an input to drag on a touch screen or the like) the same as an input during a user's manual focus manipulation. For example, the processor 520 may relatively move a lens more according to a drag distance input during manual focus manipulation with respect to a camera module (or as a camera module, the focus sharpness change of which is relatively moderate, the first focus sharpness curve 451 corresponding to the wide-angle lens) the focus sharpness change of which is relatively small. Alternatively, the processor 520 may move the lens relatively less according to a drag distance input during manual focus manipulation with respect to a camera module (or as a camera module, the focus sharpness change of which is relatively sharp, the second focus sharpness curve 452 corresponding to the telephoto lens) the focus sharpness change of which is relatively great.

According to various embodiments, the processor 520 may adjust the focal sharpness variation according to the user's touch according to the parameters shown in Table 1 below.

manual focus manipulation part of the first camera module 410. For example, if it is assumed that the whole length of the manual focus manipulation part of the first camera module 410 is 40 mm, in the case where a value obtained by

TABLE 1

|  | First camera module (wide-angle) | Second camera module (telephoto) |
| --- | --- | --- |
| F-number | 2 | 4 |
| Focus lens sensitivity | 1 | 4 |
| The unit step movement amount of image-plane reference focus lens | F (f-number) × δ = 2 × 4 = 8 um | F (f-number) × δ = 4 × 4 = 16 um |
| The unit step movement amount of a lens reference focus lens | 8/1 (sensitivity) = 8 um | 16/4 (sensitivity) = 4 um |
| The total movement amount of an image-plane reference focus lens | 4 mm (assumed as a design value) | 12 mm (assumed as a design value) |
| Converting the total movement amount of the image-plane reference focus lens to an image-plane reference unit step amount | 4,000/8 = 500 step | 12,000/16 = 750 step |
| The whole length of a manual focus manipulation part | 40 mm (assumption) | 40 mm × 750 step/500 step = 60 mm |
| The image-plane reference unit step amount upon manipulating the movement of 4 mm in the manual focus manipulation part | 500 step × 4 mm/40 mm = 50 step | 750 step × 4 mm/60 mm = 50 step |
| The lens reference movement amount upon manipulating the movement of 4 mm in the manual focus manipulation part | 50 step × 8 um/1 = 400 um | 50 step × 16 um/4 = 200 um |

The total length of a manual focus manipulation part displayed in the display 160 may vary depending on the length of the total movement amount of the image-plane reference focus lens.

For example, if the f-number of the first camera module 410 is 2, if the f-number of the second camera module 420 is 4, and if the circle of confusion (CoC) of the first camera module 410 is the same (e.g., δ=4 um) as the CoC of the second camera module 420, the unit step movement amount of the image-plane reference focus lens of the first camera module 410 may be 8 um, and the unit step movement amount of the image-plane reference focus lens of the second camera module 420 is 16 um.

For example, if the focus lens sensitivity of the first camera module 410 is 1, and if the focus lens sensitivity of the second camera module 420 is 4, the unit step movement amount of the lens reference focus lens of the first camera module 410 may be 8 um, and the unit step movement amount of the lens reference focus lens of the second camera module 420 may be 4 um.

In some embodiments, the value obtained by converting the total movement amount of the image-plane reference focus lens to an image-plane reference unit step amount may be obtained by dividing the total movement amount of the image-plane reference focus lens by the unit step movement amount of the image-plane reference focus lens. As such, the converted value of the first camera module 410 may be 500 steps, and the converted value of the second camera module 420 may be 750 steps.

An object corresponding to the total movement amount of the image-plane reference focus lens of the first camera module 410 may be displayed in a display in the form (e.g., 40 mm corresponding to the total length of a manual focus manipulation part) corresponding to N-times ('N' is a real number) of 4 mm.

According to various embodiments, the whole length of the manual focus manipulation part of the second camera module 420 may be obtained through a ratio of an image-plane reference unit step amount to the whole length of the converting the total movement amount of the image-plane reference focus lens of the second camera module 420 to the image-plane reference unit step amount is multiplied by the whole length of the manual focus manipulation part of the first camera module 410 and then the total movement amount of the image-plane reference focus lens of the first camera module 410 is divided by a value converted to an image-plane reference unit step amount, the whole length of the manual focus manipulation part of the second camera module 420 may be 60 mm. As such, the object may be output to the display 160 in the form (e.g., the whole length "60 mm" of the manual focus manipulation part) corresponding to M-times ('M' is a real number) of the total movement amount "12 mm" of the image-plane reference focus lens of the second camera module 420. When the manual focus manipulation part of the first camera module 410 manipulates the movement of a specified value (e.g., 4 mm), the image-plane reference unit step amount may be obtained through a ratio of the total movement amount of the image-plane reference focus lens to the whole length of the manual focus manipulation part. For example, in the above-described example, the image-plane reference unit step amount of the first camera module 410 may be the value calculated depending on a ratio of the total movement amount of the image-plane reference focus lens to the whole length of the manual focus manipulation part, and may be 50 steps. As described above, the image-plane reference unit step amount of the second camera module 420 may be 50 steps. In the case where the calculated image-plane reference unit step amount is converted to the lens reference movement amount, the lens reference movement amount of each camera module may be a value obtained by multiplying the unit step movement amount of an image-plane reference by the unit step movement amount of the image-plane reference focus lens and by dividing the multiplied result by the sensitivity of a focus lens; the lens reference movement amount of the first camera module 410 may be 400 um, and the lens reference movement amount of the second camera module 420 may be 200 um. As described above, in the first camera module 410 and the second camera module 420, the change of focus sharpness may be identically maintained as 50 steps according to the same movement amount (movement of 4 mm in this example) of a focus manipulation part; at this time, the focus lenses may move by different movement amounts, respectively.

Referring to the non-limiting example of FIG. 5, when the diameter 'D' of a lens, a focal length 'f', and a CoC 'δ' are formed as illustrated in FIG. 5, the focal depth may have a value including a front depth and a back depth from a lens with respect to a focus location. As a result, as shown in FIG. 5, the front depth and the back depth may correspond to depth of field. The size of the CoC may be determined by the pixel size of an image sensor mounted in each camera module.

The processor 520 may vary the drive unit step of an actual focus lens depending on f-number and the sensitivity of a focus lens for each optical system (or for each camera module) such that the focus sharpness change of the image-plane reference according to a user input is identically maintained with respect to the image plane of the camera module. According to various embodiments, even though optical systems (e.g., wide-angle and telephoto) are different from each other, the different optical systems may have the drive unit step of the same focus lens depending on the optical design.

According to various embodiments, the processor 520 may adjust the manual focus manipulation part 571 and the current focus location display part 583 by using a focus stroke difference for each optical system. If the unit step variation of the focus lens of the image-plane reference is applied to a focal depth reference (Fδ, Fδ/2, Fδ/4, or the like or F×P (pixel), 2FP, or the like, hereinafter, 'F' is f-number, and 'δ' is CoC), the focus sharpness variation may be uniformly changed regardless of the changing optical system. As such, the processor 520 may determine the movement amount of the drive unit step of a focus lens such that the focus sharpness variation of the image-plane reference is uniform.

As described above, with regard to a focus change, since a focus adjustment module is capable of driving a lens group, the movement amount of the actual focus adjustment module may be changed depending on the sensitivity (the magnitude of a movement amount for moving a lens depending on the amount of input current of a specified magnitude) of the focus adjustment module. As such, the movement amount of a focus adjustment module corresponding to the focus sharpness variation may be defined as f-number, the pixel pitch of an image sensor, the sensitivity combination of a focus adjustment module. According to an embodiment, when a user input (e.g., touch movement N mm) occurs on a user interface associated with the same focus sharpness variation with respect to a plurality of camera modules, the processor 520 may differently set the movement amount of the lens optical part 603 of each of camera modules such that a focal depth change has the same value. For example, with regard to a first user input (e.g., 2 mm touch movement), the processor 520 may allow the lens optical part movement amount of a wide-angle camera module to become 9 um and may allow the lens optical part movement amount of the telephoto camera module to become 6 um, such that the focus sharpness variation is uniform.

According to various embodiments, in a manual focus mode, in the case where only the zoom is changed, if the focal length is changed at the focal length of a camera module being currently executed, the processor 520 may adjust a focus location such that the focus location is also varied to be suitable for the changed focal length. For example, in the case where the operation of a wide-angle camera module is changed to the operation of a telephoto camera module, the processor 520 may extract a subject distance through the focus location in the wide-angle camera module and may move the focus lens to the corresponding location after substituting the extracted subject distance into the telephoto camera module to extract the location information of a focus. The processor 520 may update a focus location display associated with the operation of the telephoto camera module concurrently with the movement of a focus lens.

Figure 6:
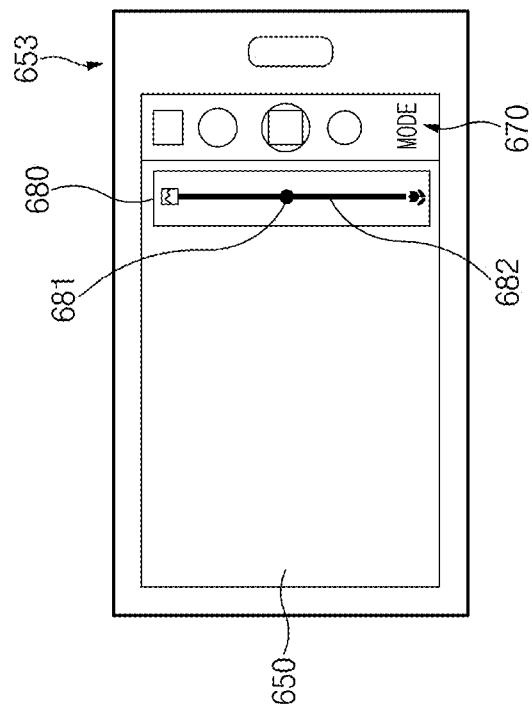
FIG. 6 illustrates an example of a screen interface associated with operation of a first camera module, according to various embodiments of the present disclosure.
Figure 6:
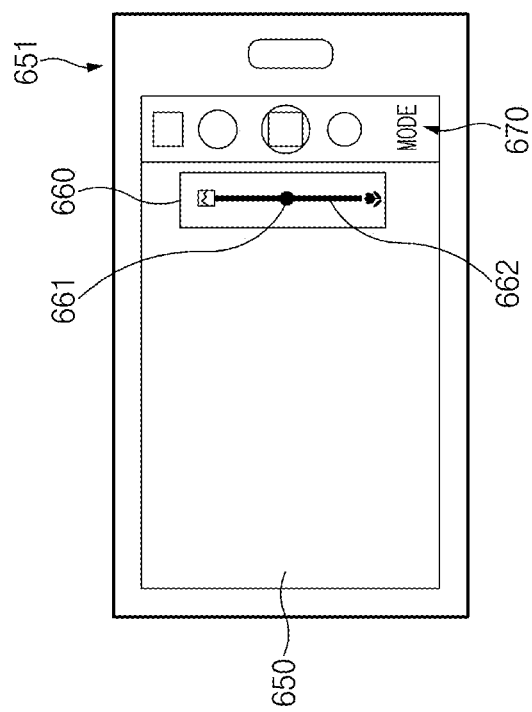

FIG. 6 illustrates a screen interface associated with an operation of a camera module in a first state 651 and a second state 653, according to various embodiments of the present disclosure.

Referring to the non-limiting example of FIG. 6, the electronic device 100 may activate at least one camera module in compliance with the activation of a camera function and may output a user interface associated with the control of the activated at least one camera module on a display 650. For example, as illustrated in state 651, the electronic device 100 may output a first focus manipulation object 660 (or a controller or a virtual controller) and a camera control object 670 on the display 650.

A first focus location indicator 661 in the first focus manipulation object 660 may move in a first focus stroke area 662 in response to a user touch. For example, in response to a touch selection input to select the first focus location indicator 661 and a touch movement input to move in a specified direction (e.g., a upper-side direction or a bottom-side direction), the first focus location indicator 661 may move in the upper-side direction or the bottom-side direction in the first focus stroke area 662. As the first focus location indicator 661 moves in the first focus stroke area 662, the processor 120, 320, or 520 (hereinafter, descriptions based on the processor 520) of the electronic device 100 may adjust the focus of a camera module. For example, the camera control object 670 may include at least one menu or icon, which is associated with the camera module control of the electronic device 100. For example, the camera control object 670 may include a shutter icon, an ISO control icon, an image search icon, or the like.

According to various embodiments, if a user selects the first focus location indicator 661 and moves the first focus location indicator 661 in the first focus stroke area 662, the processor 520 may execute a focus location adjustment function in response to the movement of the first focus location indicator 661.

According to various embodiments, the processor 520 may output zoom adjustment objects 691 and 692 associated with zoom adjustment, on the display 650. For example, in a state where the first focus manipulation object 660 is output depending on the operation of a first camera module, the processor 520 may output the first zoom adjustment object 691 associated with zoom adjustment (e.g., a digital zoom adjustment function). The first zoom adjustment object 691 may be associated with the digital zoom adjustment function of the first camera module. If a user input to adjust a zoom magnification by using the first zoom adjustment object 691, the processor 520 may adjust a digital zoom magnification corresponding to the user input with respect to the image collected by the first camera module.

Alternatively, in a state where a second focus manipulation object 680 (or a controller or a virtual controller) is output depending on the operation of the second camera module, the processor 520 may output the second zoom adjustment object 692 associated with zoom adjustment. The second zoom adjustment object 692 may be associated with the digital zoom adjustment function of the second camera module. If a user input to adjust the magnification of the second zoom adjustment object 692 occurs, the processor 520 may adjust a digital zoom magnification corresponding to the user input with respect to the image obtained by the second camera module.

According to various embodiments, a type of the activated camera module may be changed depending on the zoom magnification adjustment of the zoom adjustment object. For example, as in the first zoom adjustment object 691, in the case where the zoom magnification for the obtained image is less than two times, the zoom magnification of the image obtained by the first camera module may be adjusted; as in the second zoom adjustment object 692, in the case where the adjustment of the zoom magnification that is not less than three times occurs (e.g., in the case where a user input to change an indicator (circle point), for adjusting the zoom magnification, from two times to three times in a zoom adjustment object), the second camera module may be activated and may obtain an image, and the three times zoom may be applied based on the image obtained by the second camera module. If a user input to adjust the zoom magnification to two times or less occurs in an image, the zoom magnification of which is three times, the application of two times zoom may be maintained based on the image obtained by the second camera module, or the application of two times zoom may be performed based on the image obtained by the first camera module. In the above-mentioned descriptions, while the second camera module obtains an image, the first camera module may be activated and may maintain a standby state. Alternatively, while the first camera module obtains an image, the second camera module may be activated and may maintain a standby state. As described above, in one zoom adjustment object, in the case where the zoom magnification is changed in response to a user input, the processor 520 may obtain an image by using a specified camera module among the first camera module or the second camera module and may apply the zoom magnification of the obtained image. In this operation, in the case where the zoom magnification to be applied is relatively high, the processor 520 may obtain an image by using a camera (e.g., the second camera module) of a telephoto characteristic; in the case where the zoom magnification to be applied is relatively low, the processor 520 may obtain an image by using a camera (e.g., the first camera module) of a wide-angle characteristic.

According to various embodiments, electronic device 100 may output a second user interface associated with the control of another activated camera module, on the display 650. For example, as illustrated in state 653, the electronic device 100 may output the second focus manipulation object 680 and the camera control object 670 on the display 650.

A second focus location indicator 681 in the second focus manipulation object 680 may move in a second focus stroke area 682 in response to a user touch. The second focus stroke area 682 may have a size corresponding to the focus location of the second camera module. As such, in the case where the focal lengths of the first camera module and the second camera module are different from each other, the second focus stroke area 682 may be displayed differently from the first focus stroke area 662. Alternatively, in the case where the sensitivity (e.g., a focus location variation changed depending on a user touch input) of the focus sharpness variation of the first camera module is different from the sensitivity of the focus sharpness variation of the second camera module, the size of the second focus stroke area 682 may be displayed differently from the size of the first focus stroke area 662.

According to various embodiments, if a user selects the second focus location indicator 681 and moves the second focus location indicator 681 in the second focus stroke area 682, the processor 520 may adjust a focus location depending on the movement of the second focus location indicator 681.

When a switch icon included in the camera control object 670 is selected, the processor 520 of the electronic device 100 may change from the activation state of the first camera module 210 or 410 to the activation state of the second camera module 220 or 420 or may change from the activation state of the second camera module 220 or 420 to the activation state of the first camera module 210 or 410. If changing from the activation state of the first camera module 210 to the activation state of the second camera module 220, the processor 520 may obtain focus information (e.g., the location of the first focus location indicator 661 in the first focus stroke area 662) in a state where the first camera module 210 is activated, and may apply the obtained focus information to the second focus manipulation object 680. For example, the processor 520 may determine the display of the second focus location indicator 681 in the second focus stroke area 682 depending on the display location of the first focus location indicator 661 in the first focus stroke area 662. As such, the second focus location indicator 681 may be disposed at a focus location the same as the location of the first focus location indicator 661 in the first focus manipulation object 660. The processor 520 may adjust the focus of the second camera module 220, depending on the location of the second focus location indicator 681.

Figure 7:
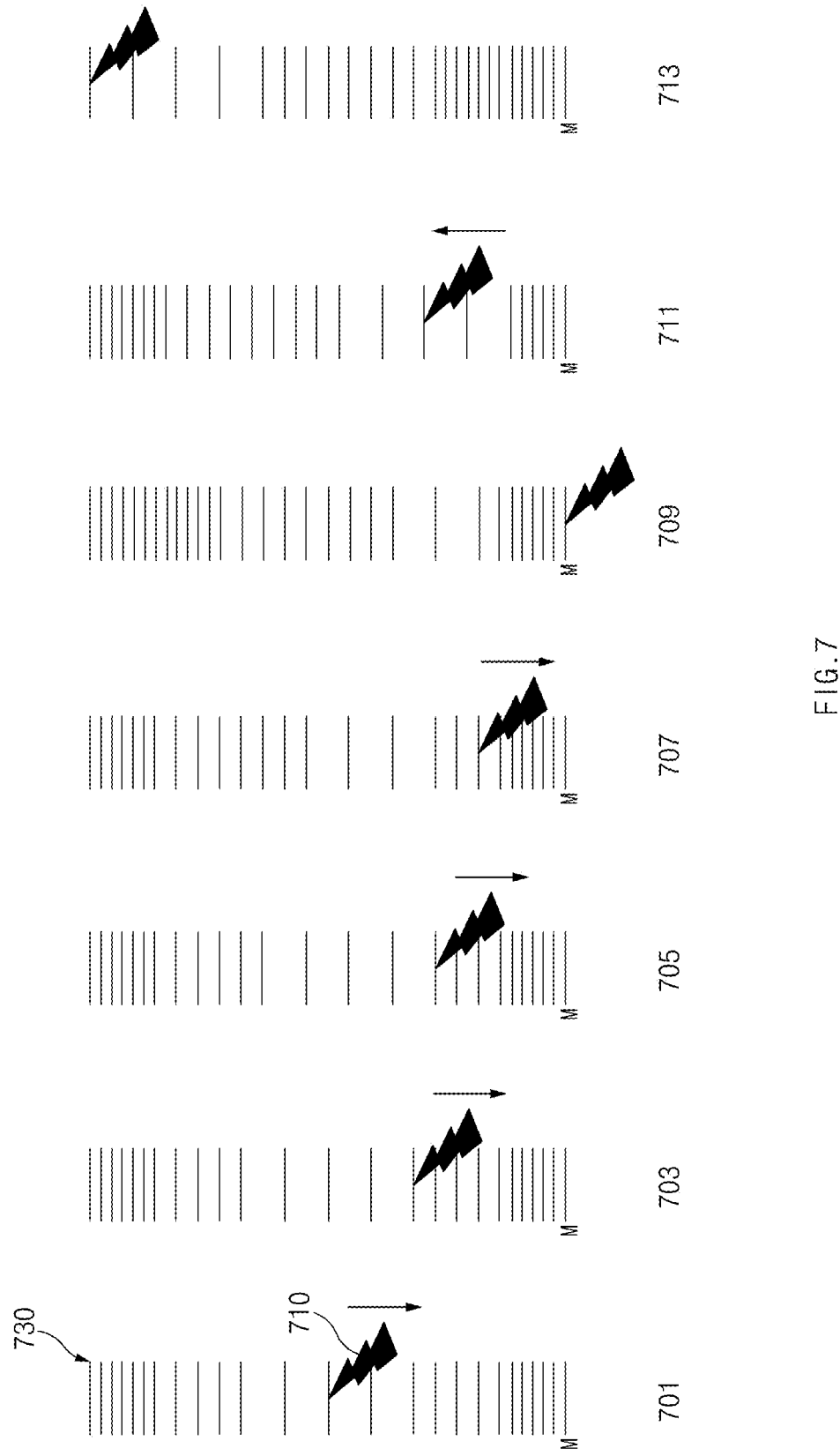
FIG. 7 illustrates a view of focal length manipulation, according to certain embodiments of the present disclosure.

FIG. 7 illustrates a view of focus length manipulation, according to various embodiments of the present disclosure.

Referring to the non-limiting example of FIG. 7, with regard to a focus manipulation object described above in FIG. 6, the processor 120, 320, or 520 (hereinafter descriptions based on the processor 120) may allow the operating feeling to be standardized with respect to a manipulation point 710 and may differently set the operation feeling as the distance from the point of the manipulation point 710 increases. According to at least one embodiment, in the case where a focus point moves from the end portion such as macro in a focus stroke area and infinity by using a drag (e.g., when moving the focus point from the end point in an opposite direction), the processor of an electronic device may allow the operating feeling to be standardized and may allow the operating feeling to be standardized at a point in time when a user touches the focus point, upon manipulating the focus point after moving by using a touch. In the case where a focus manipulation device and a display part are separated from each other, the processor 120 may set a focus manipulation device such that manipulation sensitivity is standardized regardless of camera module.

As described above, even while using the same UI between camera modules having different optical characteristics, an electronic device according to some embodiments of the present disclosure may provide the same operating feeling. In this regard, in the manipulation of the focal length requiring a relatively long stroke area, the electronic device 100 may allow the same focus sharpness change to occur, while providing a relatively short stroke area and a ruler UI of the same interval at a periphery of the manipulation point 710 of FIG. 7. According to various embodiments, the electronic device 100 may provide a ruler UI of a short interval at the end of the stroke area. However, if the manipulation point 710 reaches the end, the electronic device 100 may display the ruler UI of the same interval based on the manipulation point 710 to output a UI for providing the same the operating feeling. In this regard, as illustrated in FIG. 7, in state 701, while the manipulation point 710 moves down as illustrated in state 703, state 705, state 707, and state 709, the scale of the peripheral area in which the manipulation point 710 is disposed may be changed such that the ruler UI of the same interval is provided. In addition, in the case where the manipulation point 710 moves up as illustrated in state 711 or state 713, the electronic device 100 may change the interval of a ruler in an area in which the manipulation point 710 is placed, so as to be the same as the interval of a ruler at another location.

Figure 8:
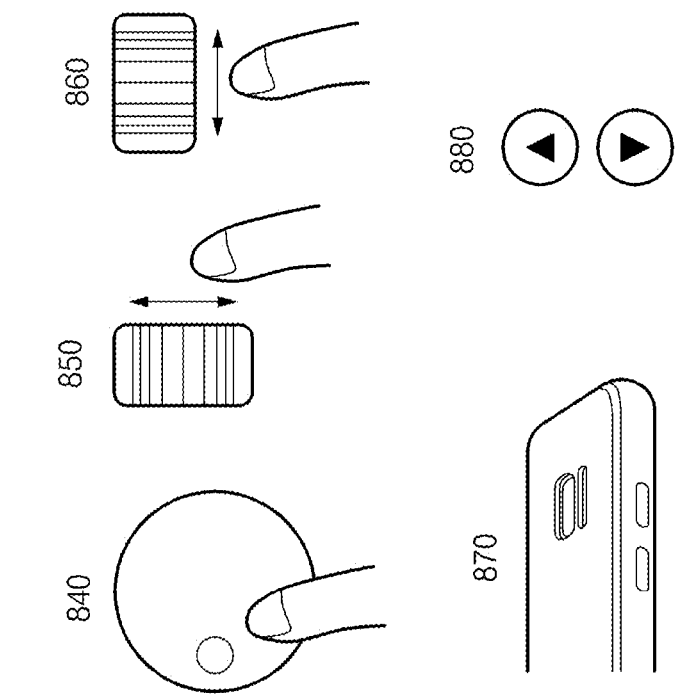
FIG. 8 illustrates aspects of a control environment associated with focal length adjustment, according to some embodiments of the present disclosure.
Figure 8:
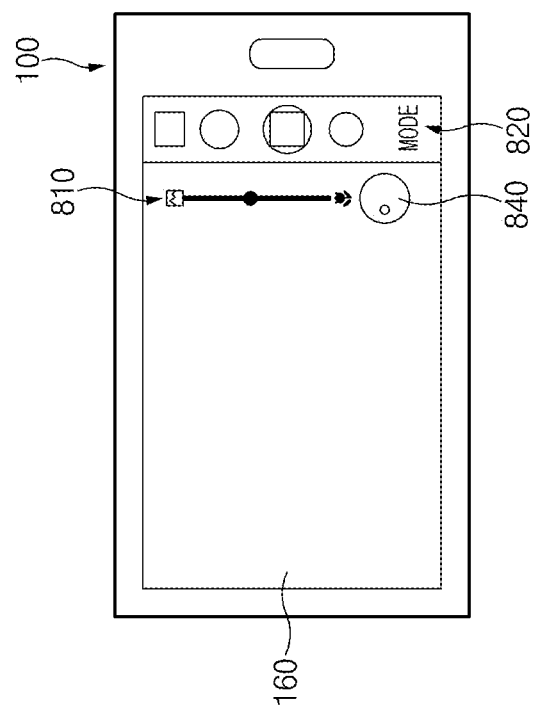

FIG. 8 illustrates aspects of a control environment associated with focus location adjustment, according to some embodiments of the present disclosure.

Referring to the non-limiting example of FIG. 8, the electronic device 100 may output a focus manipulation object 810 and a camera control object 820 on the display 160 (e.g., the display 650). According to at least one embodiment, the electronic device 100 may include a plurality of camera modules, and the processor 120 (e.g., the processor 320 and 520) may output a focus manipulation object corresponding to the activated camera module.

According to various embodiments, the processor 120 may output the focus manipulation object 810 (or controller or virtual controller) in various forms. For example, as illustrated in FIG. 8, the processor 120 may output a jog dial object 840 associated with focus manipulation, on the display 160. If a touch event to rotate the jog dial object 840 occurs, the processor 120 may change the focus location of the camera module being currently activated, depending on the rotational direction and the rotation distance of the jog dial object 840. The processor 120 may output the jog dial object 840 of the same shape, regardless of a type of a camera module. If a touch input event to rotate the jog dial object 840 occurs, the processor 120 may adjust the focus location of the camera module being currently activated, depending on the rotational direction and the rotation distance and may apply a rotation distance value to the focus sharpness change of each of camera modules. For example, even though the jog dial object 840 rotates by 2 mm in a state where the first camera module is being activated, or even though the jog dial object 840 rotates by 2 mm in a state where the second camera module is being activated, the processor 120 may allow the camera module being currently activated to have the same focus sharpness variation. According to various embodiments, the processor 120 may set the focus manipulation object 810 so as to be used to adjust a first unit (or a first interval unit) focus location and may set the jog dial object 840 so as to be used to adjust a second unit (or second interval unit) focus location. The interval of a second unit may be shorter than the interval of a first unit. As such, in the case of fine adjustment, a user may manipulate a focus location by using the jog dial object 840; in the case of rough adjustment of the focus location, a user may use the focus manipulation object 810. For example, the focus manipulation object 810 may be configured to perform the focus manipulation of the first number of steps (e.g., five steps), and the jog dial object 840 may be configured to perform the focus manipulation of the second number of steps (e.g., 10 steps) for each step.

According to various embodiments, the electronic device 100 may provide manipulation objects of various shapes capable of manipulating the focus location depending on the user settings. For example, the electronic device 100 may store at least one of a vertical scroll manipulation object 850, a horizontal scroll manipulation object 860, a physical button manipulation object setting value 870, and a GUI manipulation object 880 in the memory 140; if the manual focus manipulation of a camera module is requested, the electronic device 100 may output the set manipulation object to the display 160 or may allocate the set manipulation object to a physical button, depending on a user setting. The vertical scroll manipulation object 850 and the horizontal scroll manipulation object 860 may replace the focus manipulation object 810 and the jog dial object 840 that are described above, respectively. For example, the vertical scroll manipulation object 850 may be used for a rough focus location change, and the horizontal scroll manipulation object 860 may be used for a fine focus location change.

According to various embodiments, an electronic device may include a memory and a processor (e.g., the processor 120, 320, or 520). The processor may be configured to receive a request of an execution of a camera function, to receive a signal for adjusting a focus associated with an external object by using the first camera module (e.g., camera module 210 or 410) or the second camera module (e.g., camera module 220 or 420), in response to the request to adjust the first unit or the second unit such that a difference between the first focus sharpness variation and the second focus sharpness variation belongs within a specified range, and to move the first lens driving part (e.g., a lens driving part for the first camera module of the lens driving part 202) depending on the adjusted first unit or the second lens driving part (e.g., a lens driving part for the second camera module of the lens driving part 202) depending on the adjusted second unit to adjust the focus associated with the external object.

According to various embodiments, the processor may be configured to adjust the first unit or the second unit such that the first focus sharpness variation and the second focus sharpness variation are substantially equal to each other.

According to various embodiments, the processor may be configured to adjust the first unit or the second unit so as to reduce the difference, based at least partly on a first f-number corresponding to the first lens driving part or a second f-number corresponding to the second lens driving part.

According to various embodiments, the processor may be configured to adjust the first unit or the second unit so as to reduce the difference, based at least partly on a first sensitivity corresponding to the first lens driving part or a second sensitivity corresponding to the second lens driving part.

According to various embodiments, the processor may be configured to adjust the first unit or the second unit based on depth associated with the external object from the first camera module or the second camera module.

According to various embodiments, the processor may be configured to receive an external input through a controller (or a virtual controller) for adjusting the focus and to move the first lens driving part or the second lens driving part depending on a corresponding adjusted unit among the adjusted first unit and the adjusted second unit to adjust the focus, in response to the external input.

According to various embodiments, the processor may be configured to adjust the first unit or the second unit depending on a pixel pitch of an image sensor of the camera module. For example, the processor may be configured to adjust the focus in a first unit (e.g., a unit greater than the first unit) in the case of a camera module with a relatively great pixel pitch of an image sensor and adjust the focus in a second unit (e.g., a unit smaller than the first unit) in the case of a camera module with a relatively small pixel pitch of the image sensor.

According to various embodiments, the processor may be configured to present the controller through a display operatively connected to the electronic device.

According to various embodiments, the processor may be configured to change a form of the controller based at least partly on the adjustment.

According to various embodiments, an electronic device (e.g., electronic device 100) may include a camera (e.g., camera 600) including a lens driving part, a memory (e.g., memory 140) storing first unit information and second unit information, which are to be used to move the lens driving part, and a processor (e.g., processor 120, 320, or 520). The first unit information may be configured such that the camera causes a first focus sharpness variation and the second unit information may be configured such that the camera causes a second focus sharpness variation. The processor may be configured to receive a signal for adjusting a focus associated with an external object by using the camera, to verify a state of the electronic device associated with the reception of the signal, to select corresponding unit information among the first unit information and the second unit information, based at least partly on the state, and to move the lens driving part depending on the corresponding unit information to adjust the focus associated with the external object.

According to various embodiments, the processor may be configured to adjust the first unit or the second unit such that the first focus sharpness variation and the second focus sharpness variation are substantially equal to each other, to adjust the first unit or the second unit so as to reduce a difference, based at least partly on a first f-number corresponding to the first lens driving part or a second f-number corresponding to the second lens driving part, to adjust the first unit or the second unit so as to reduce the difference, based at least partly on a first sensitivity corresponding to the first lens driving part or a second sensitivity corresponding to the second lens driving part, and to adjust the first unit or the second unit based on depth associated with the external object from the first camera module or the second camera module.

According to various embodiments, the processor may be configured to receive an external input through a controller (or a virtual controller) for adjusting the focus and to move the first lens driving part or the second lens driving part depending on a corresponding adjusted unit among the adjusted first unit and the adjusted second unit to adjust the focus, in response to the external input.

According to various embodiments, the processor may be configured to present the controller through a display operatively connected to the electronic device.

According to various embodiments, the processor may be configured to change a form of the controller based at least partly on the adjustment.

According to various embodiments, an electronic device (e.g., the electronic device 100) may include a display (e.g., display 160), a first camera module (e.g., first camera module 210 or 410) including a first lens module (e.g., first camera unit 411, a barrel including a lens among elements included in the first camera module, a first lens structure, or the like) and a first lens driving part (e.g., the lens driving part, a focus adjustment module to move a lens barrel, or a first lens driving device) moving the first lens module in a first movement unit, a second camera module (e.g., second camera module 220 or 420) including a second lens module (e.g., second camera unit 421, a barrel including a lens among elements included in the second camera module, a second lens structure, or the like) and a second lens driving part (e.g., a focus adjustment module to move the second lens module, or the like) moving the second lens module in a second movement unit, and a processor (e.g., processor 120, 320, or 520) electrically connected to the first camera module and the second camera module. The processor may be configured to receive a user input with respect to one or more external objects (e.g., a subject being a target to be captured (including background)), in a state where the first camera module is activated (e.g., a state where the corresponding camera module is selected to obtain a subject image, a state where power is supplied to a camera module, or a state where a photo is ready to be captured), to determine activation of the second camera module with respect to the one or more external objects, in response to the user input, and to present a user interface (e.g., UI including at least one object capable of receiving a user input (e.g., touch input) associated with a focus sharpness change) controlled (or set) such that a difference between a first focus sharpness variation of the first camera module changed by a change of a focus and a second focus sharpness variation of the second camera module changed by the change of the focus belongs within a specified range, through the display (e.g., the display 160) based at least partly on the activation of the second camera module.

For example, the fact that the difference between the first focus sharpness variation and second focus sharpness variation belongs within the specified range may include a range where the values of the two variations become the same value as each other.

According to various embodiments, a state where a specified first camera is activated by a user input may be changed to a state where another camera is activated, by a zoom change or the field of view (FoV) conversion. Herein, the zoom change or the FoV conversion does not necessarily change the activation of the camera. In the case where the zoom change is beyond a specified range or the FoV conversion occurs beyond the specified range, a type of the activated camera may be changed.

According to various embodiments, one of the first camera module and the second camera module may include a wide-angle camera module, and the other of the first camera module and the second camera module may include a telephoto camera module.

According to various embodiments, upon operating a corresponding camera module among the first camera module and the second camera module, in association with a change of a focus location of the corresponding camera, the processor may be configured to present a corresponding manipulation object among a first focus manipulation object having a first stroke area corresponding to the first camera module and a second focus manipulation object having a second stroke area corresponding to the second camera module, through the display.

According to various embodiments, the processor may be configured to control the user interface such that the first focus sharpness variation is adjusted by a first touch distance associated with the first focus manipulation object and the second focus sharpness variation is adjusted by a second touch distance associated with the second focus manipulation object.

According to various embodiments, the processor may be configured, during the activation of the first camera module, to adjust the first movement unit of the first focus sharpness variation based at least partly on a first f-number corresponding to the first lens driving part, and, during the activation of the second camera module, to adjust the second movement unit of the second focus sharpness variation based at least partly on a second f-number corresponding to the second lens driving part.

According to various embodiments, the processor may be configured, during the activation of the first camera module, to adjust the first movement unit of the first focus sharpness variation, based at least partly on a diameter of a first circle of confusion or first sensitivity corresponding to the first lens driving part, and, during the activation of the second camera module, to adjust the second movement unit of the second focus sharpness variation, based at least partly on a diameter of a second circle of confusion or second sensitivity corresponding to the second lens driving part.

According to various embodiments, the processor may be configured to obtain current focus location information upon activating the first camera module, and to adjust a focus location of the second camera module upon activating the second camera module so as to have a focus location the same as a focus location of the first camera module.

According to various embodiments, the processor may display the current focus location of a second camera module having a focus location value the same as the focus location of the first camera module, and the processor may be configured to display the relative location of the current focus location based on the entire focus location of the second camera module.

Figure 9A:
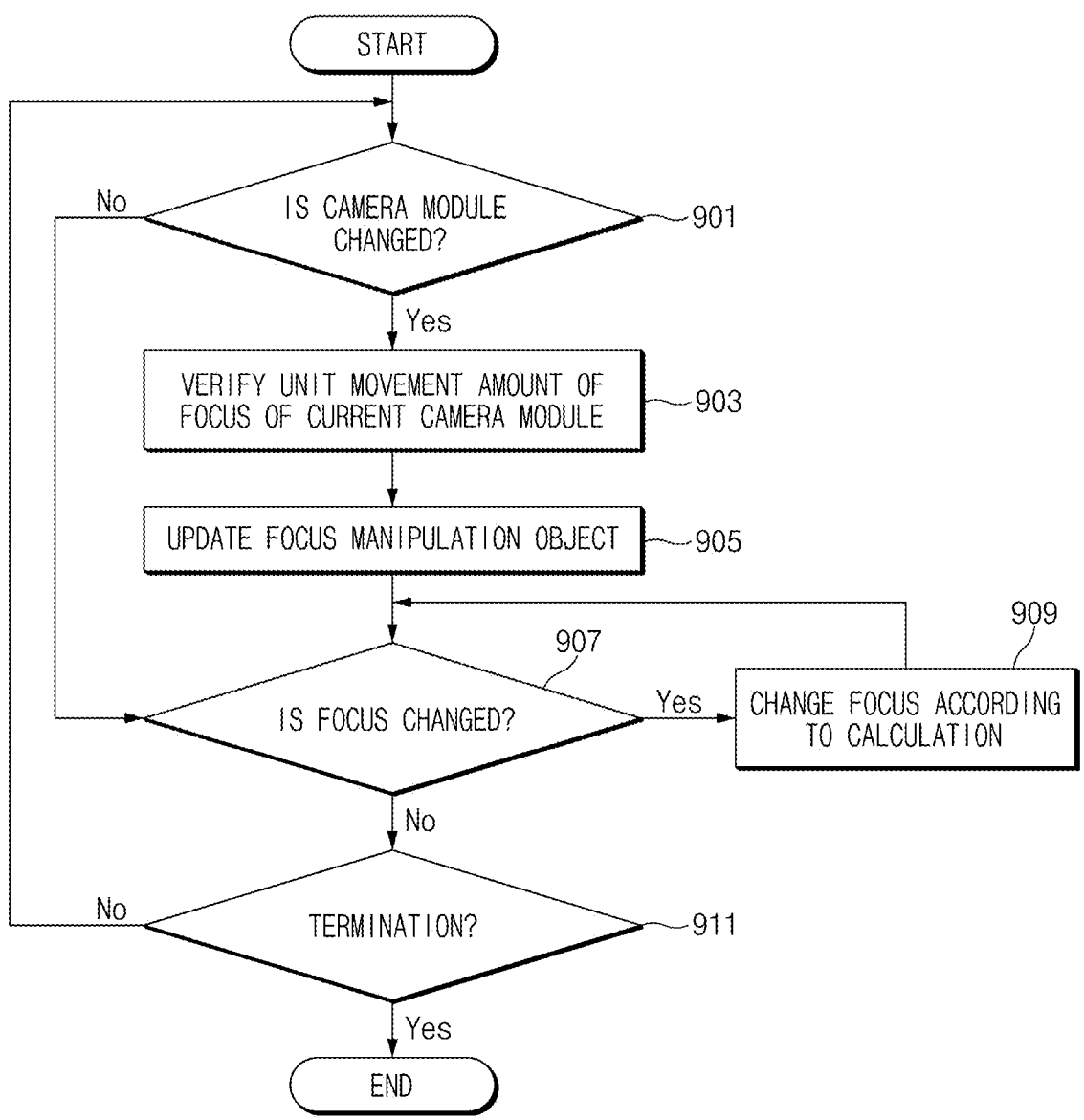
FIG. 9A illustrates operations of a focus control method, according to some embodiments of the present disclosure.

FIG. 9A illustrates operations of a focus control method, according to various embodiments of the present disclosure.

Referring to the non-limiting example of FIG. 9A, with regard to a focus control method, the processor 120 (e.g., processor 320 or 520) may verify a user input or schedule arrival that requests camera activation. The processor 120 may activate a camera in response to the user input or the schedule arrival and may adjust the focus of the camera depending on the settings. In this operation, in the case where the manual focus adjustment of a camera is set, the processor 120 may output a focus manipulation object associated with manual focus adjustment to the display 160 or the display 650. Alternatively, the processor 120 may output the specified focus manipulation object to the display 160 depending on the focus location of the currently activated camera module. The output focus manipulation object may include a plurality of objects for rough focus location adjustment, fine focus location adjustment, or the like.

According to some embodiments, in operation 901, the processor 120 may determine whether an input event associated with a camera module change occurs. For example, the processor 120 may determine whether the selection input for a menu or an icon, a gesture input, or the like for the activation of the second camera module occurs during the activation of the first camera module. In the case of a gesture input, the processor 120 may determine whether a gesture (e.g., a gesture corresponding to an operation of disposing the electronic device 100 such that the front surface of a display faces a user or disposing the electronic device 100 so as to face in a rear direction with respect to a user) to place the electronic device 100 in a specified direction occurs. Upon changing the activation state between a rear camera and a front camera, the processor 120 may update a focus manipulation object and may apply a focus location, based at least partly on gesture occurrence. According to various embodiments, in the case where the electronic device 100 supports a voice command function, the processor 120 may collect a user voice input by using a microphone in association with a camera module change and may perform speech recognition on the collected voice.

If an input event associated with the camera module change occurs, in operation 903, the processor 120 may verify a unit movement amount of a focus of the current camera module. According to at least one embodiment, the electronic device 100 may store and manage the unit movement amount information of the focus of each of the camera modules, in the memory 140. As such, the processor 120 may verify the unit movement amount information of the focus associated with the activated camera module, in the memory 140. According to various embodiments, the processor 120 may request and obtain the unit movement amount information of the focus, in the activated camera module.

According to various embodiments, at operation 905, the processor 120 may update a focus manipulation object. For example, the processor 120 may output, to the display 160, the focus manipulation object corresponding to the unit movement amount of the focus of a camera module of the current activation state. In this operation, the processor 120 may apply focus information of the camera module of a previous activation state to the focus manipulation object of the currently activated camera module to allow a focus location indicator to indicate a focus location of the camera module of the previous activation state. The processor 120 may adjust the focus location of the camera module depending on the location of the focus location indicator. Alternatively, while adjusting the focus location of the camera module based at least partly on the focus information of the previous activated camera module, the processor 120 may update a focus manipulation object. The focus location adjustment and the focus manipulation object may be performed regardless of an order.

In operation 907, the processor 120 may determine whether an event associated with a focus change occurs. For example, the processor 120 may determine whether an input (e.g., a touch input event) to control the focus manipulation object occurs. If the event associated with a focus change occurs, in operation 909, the processor 120 may perform the focus change according to calculation. For example, the processor 120 may change the focus location of the camera module, depending on the movement distance of a touch event.

If the event associated with a focus change does not occur, the method proceeds from operation 901 to operation 911, wherein the processor 120 may determine whether an operation termination event associated with the operation of a camera occurs. If the operation termination event does not occur, the processor 120 may branch to operation 901 and may determine whether the input event associated with the camera module change occurs. If the input event associated with the camera module change does not occur, the processor 120 may branch to operation 907. If the operation termination event occurs, the processor 120 may terminate a camera function.

According to various embodiments, a focus control method according to an embodiment may include an operation in which a first camera module including a first lens driving part configured such that a focus lens or a structure including the focus lens moves in a first movement unit in association with a focus change is activated, an operation of outputting a first user interface associated with focus manipulation of the first camera module, an operation of receiving an activation request of a second camera module while deactivating the first camera module or while a state is transitioned to a standby state, and an operation of outputting a second user interface associated with focus manipulation of a second camera module including a second lens driving part configured such that a focus lens or a structure including the focus lens moves in a second movement unit in association with a focus change.

According to various embodiments, the operation of outputting the second user interface may include an operation of outputting the second user interface configured such that a first focus sharpness variation of the first camera module is the same as a second focus sharpness variation of the second camera module changed by the user input or is similar to the focus location of the second camera module within a specified range.

According to various embodiments, the first camera module may be a wide-angle camera module with a relatively wide FoV, and the second camera module may include a telephoto camera module with a relatively deep depth. The operation of outputting the first user interface may include an operation of outputting a first focus manipulation object having a first stroke area in association with a focus location change of the wide-angle camera upon operating the first camera module.

According to various embodiments, the operation of outputting the second user interface may include an operation of outputting a second focus manipulation object having a second stroke area in association with the telephoto camera focus location change upon operating the second camera module.

According to various embodiments, the second stroke area of the second focus manipulation object may have an area greater than a first stroke area of the first focus manipulation object.

According to various embodiments, the operation of outputting the first user interface may further include an operation of adjusting a first movement unit of the first focus sharpness variation depending on the activation of the first camera module based at least partly on a first f-number of the first lens driving part. The operation of outputting the second user interface may further include an operation of adjusting a second movement unit of the second focus sharpness variation depending on the activation of the second camera module based at least partly on a second f-number of the second lens driving part.

According to various embodiments, the operation of outputting the first user interface may further include an operation of adjusting a first movement unit of the first focus sharpness variation depending on the activation of the first camera module based at least partly on a first CoC diameter of the first lens driving part. The operation of outputting the second user interface may further include an operation of adjusting a second movement unit of the second focus sharpness variation depending on the activation of the second camera module based at least partly on a second CoC diameter of the second lens driving part.

According to various embodiments, the operation of outputting the first user interface may further include an operation of adjusting a first movement unit of the first focus sharpness variation depending on the activation of the first camera module based at least partly on first sensitivity of the first lens driving part. The operation of outputting the second user interface may further include an operation of adjusting a second movement unit of the second focus sharpness variation depending on the activation of the second camera module based at least partly on second sensitivity of the second lens driving part.

According to various embodiments, the operation of outputting the second user interface may further include an operation of obtaining current focus location information upon activating the first camera module, and an operation of adjusting a focus location of the second camera module upon activating the second camera module so as to have a focus location the same as a focus location of the first camera module.

According to various embodiments, the operation of outputting the second user interface may include an operation of displaying the current focus location of a second camera module having a focus location value the same as the focus location of the first camera module, and the operation of outputting the second user interface may include an operation of displaying the relative location of the current focus location based on the entire stroke of the second camera module.

Figure 9B:
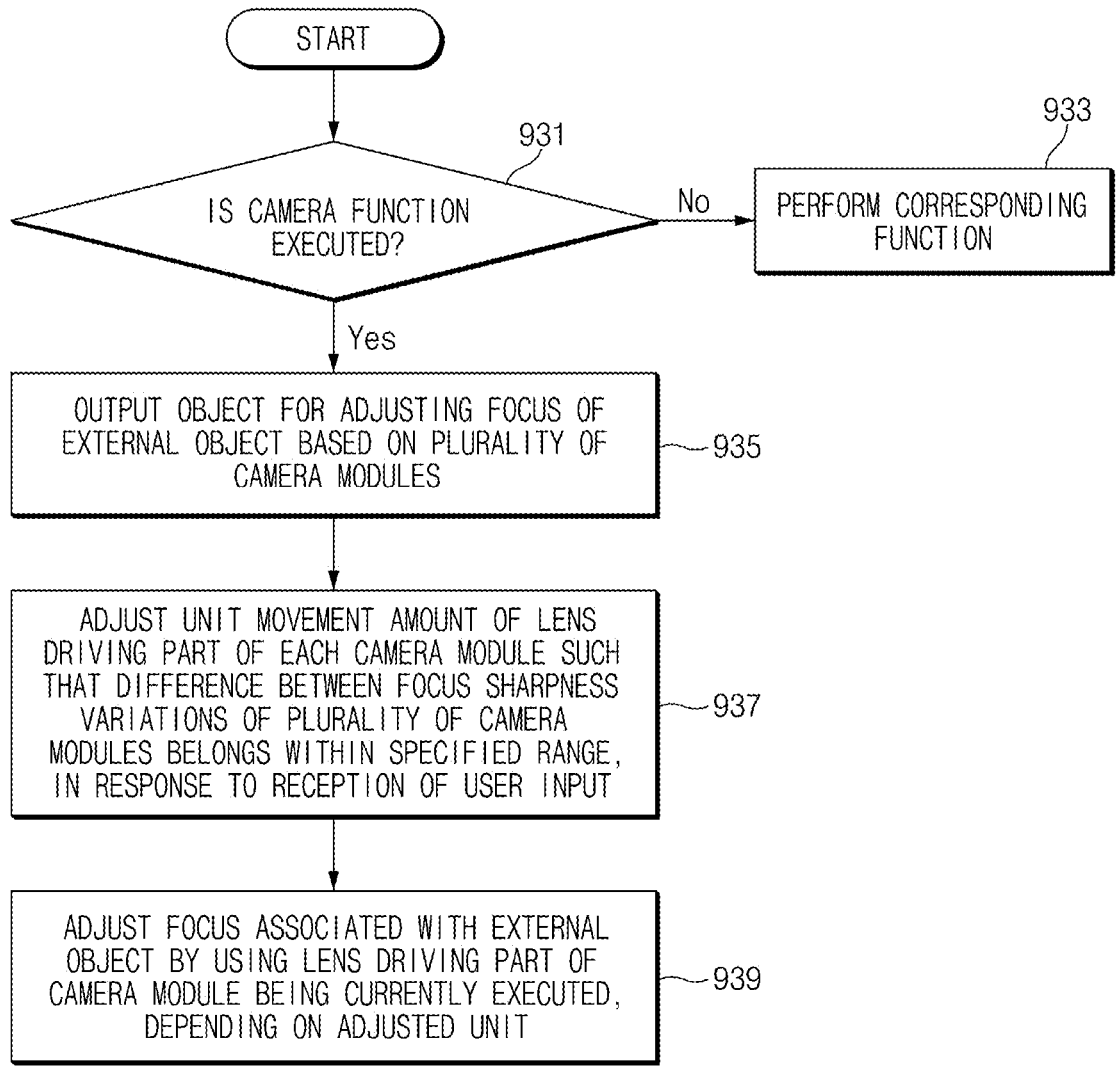
FIG. 9B illustrates a focus control method, according to various embodiments of the present disclosure.

FIG. 9B illustrates operations of a focus control method, according to some embodiments of the present disclosure.

Referring to the non-limiting example of FIG. 9B, in a focus control method according to an embodiment of the present disclosure, in operation 931, the processor 120 or 520 (hereinafter refer to as the "processor 520") may determine whether a camera function is being executed. For example, the processor 520 may determine whether a menu selection signal associated with camera function execution, an icon selection signal associated with camera function execution, or the like occurs.

If the input signal associated with camera function execution occurs, in operation 935, the processor 520 may output an object for adjusting a focus of an external object based on a plurality of camera modules. For example, the processor 520 may output a focus adjustment object to the display 160. For example, the focus adjustment object may include a focus adjustment object described above in the non-limiting example of FIG. 6.

In operation 937, the processor 520 may adjust the unit movement amount of the lens driving part of each camera module such that a difference between the focus sharpness variations of a plurality of camera modules (e.g., the first camera module 410 and the second camera module 420) belongs within a specified range, in response to the reception of a user input. With regard to the unit movement amount, a first camera module among a plurality of camera modules may have a first unit movement amount in association with the movement of a first lens driving part. As such, in the first camera module, in the case where the first lens driving part performs the movement corresponding to a first unit, the first focus sharpness variation of the first camera module may be caused. As in that described above, a second camera module among a plurality of camera modules may have a second unit movement amount in association with the movement of a second lens driving part. As such, in the second camera module, in the case where the second lens driving part performs the movement corresponding to a second unit, the second focus sharpness variation of the second camera module may be caused.

In various embodiments according to this disclosure, at operation 939, the processor 520 may adjust the focus associated with an external object (or a subject) by using the lens driving part of the camera module being currently executed, depending on the adjusted unit.

Figure 10:
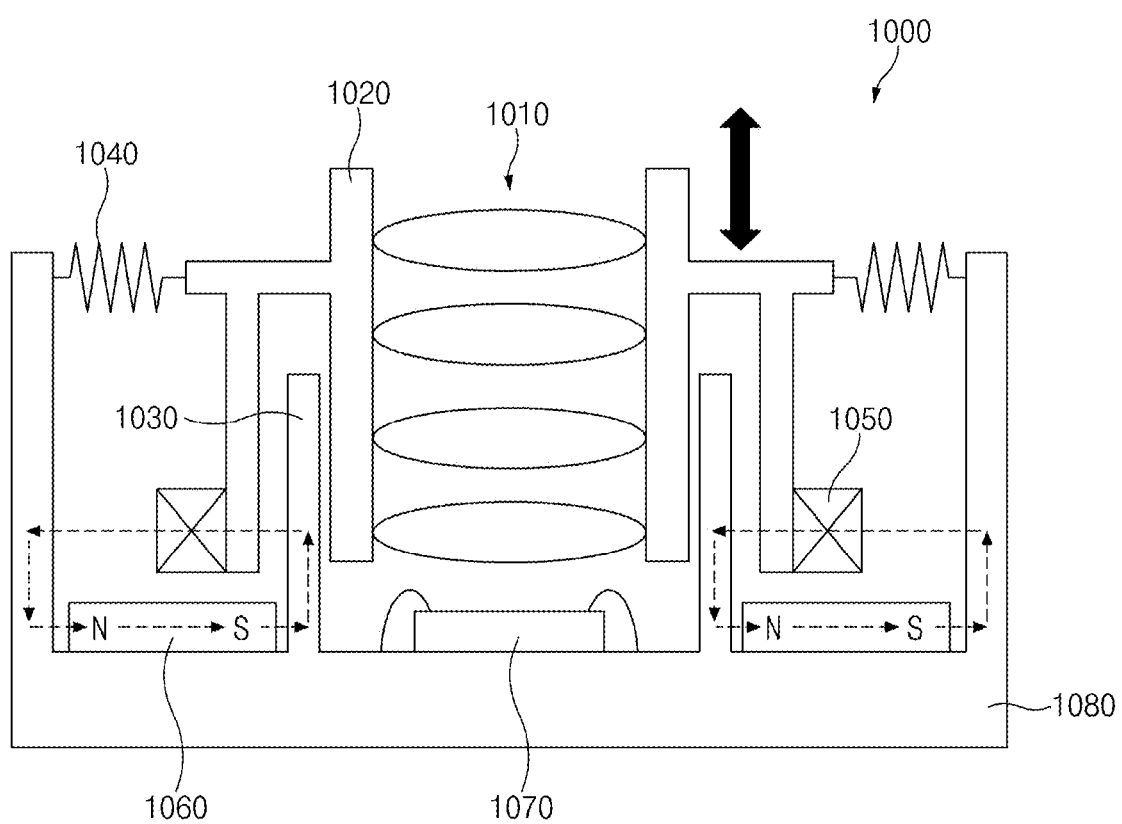
FIG. 10 is a view illustrating an example of a cross section of a camera module, according to an embodiment of the present disclosure.

FIG. 10 illustrates a cross section of a camera module, according to certain embodiments of the present disclosure.

Referring to the non-limiting example of FIG. 10, a camera module 1000 (e.g., at least part of the camera 200) may include a lens unit 1010, a turret 1020, a barrel 1030, a spring 1040, an electromagnet 1050, a permanent magnet 1060, an image sensor 1070, and a case 1080.

In the above-mentioned configuration, if a specified current is supplied to the electromagnet 1050, a repulsive force or attracting force occurs between the electromagnet 1050 and the permanent magnet 1060, and thus, the turret 1020 surrounding the lens unit 1010 may move in a vertical direction. In this operation, the spring 1040 may fix the turret 1020 to one side of the case 1080, and the turret 1020 may move the lens unit 1010 by using the repulsive force or attracting force between the electromagnet 1050 and the permanent magnet 1060 while moving in the vertical direction with respect to the barrel 1030. If the lens unit 1010 moves in the vertical direction with respect to the image sensor 1070, a focus location may be changed.

The camera module 1000 according to certain embodiments of the present disclosure may adjust the amount of current supplied to the electromagnet 1050 in response to an input signal received from a processor or under control of a camera control circuit, in response to a user input. As such, the vertical location of the turret 1020 may be adjusted, and the focus location of the camera module 1000 may be adjusted manually. According to various embodiments, the electronic device may include a plurality of camera modules; in the case where the activated camera module is changed, the processor 520 may verify the focus location value of a camera module of the previous activation state and may supply the specified current value to the electromagnet 1050 such that the focus location of the currently activated camera module is the same as the focus location of the previous camera module or is similar to the focus location of the previous camera module within a specified range. In the case where the focus unit movement amount of the camera module is different or the focus maximum distance is different, the current value supplied to the electromagnet 1050 may be set differently. In this regard, as described above, information about the amount of current applied for each focus location may be stored and managed in a lookup table such that the focus sharpness variations of the plurality of camera modules are the same as each other.

Figure 11:
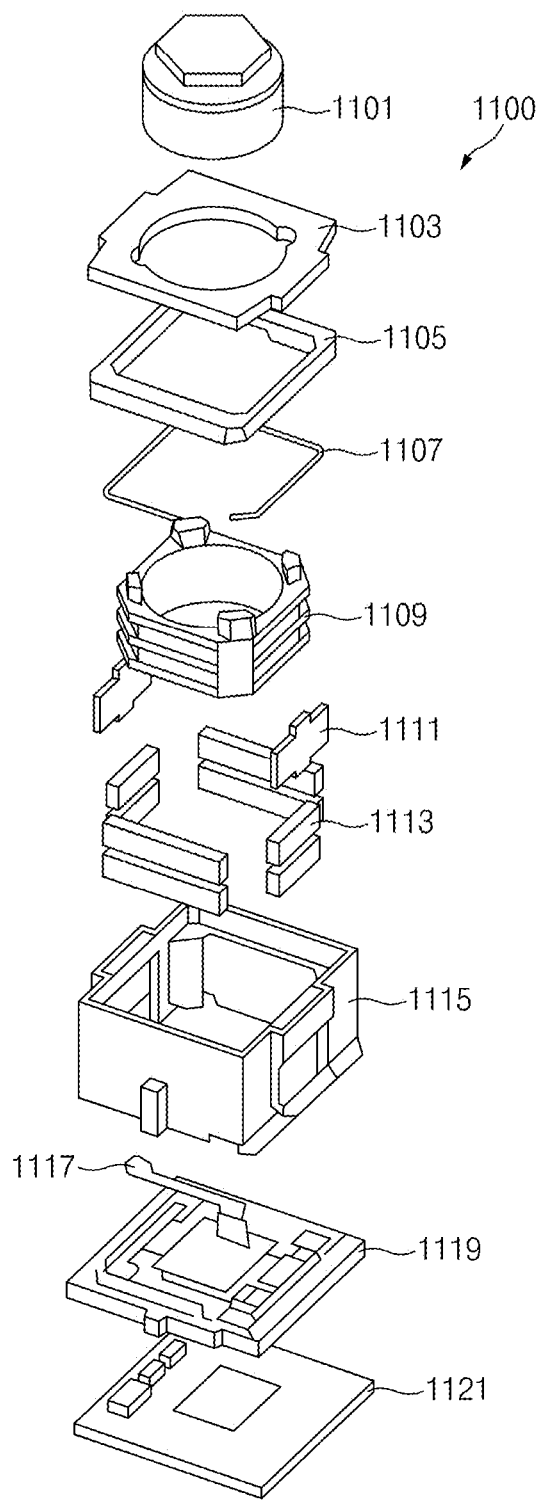
FIG. 11 illustrates a camera module, according to certain embodiments of the present disclosure.

FIG. 11 illustrates an example of a camera module, according to various embodiments of the present disclosure.

Referring to the non-limiting example of FIG. 11, a camera module 1100 (e.g., first camera module 210 or second camera module 220) according to various embodiments of the present disclosure may be a small camera module capable of being inserted into a smartphone or the like. The camera module 1100 may include a lens 1101, a case 1103, an upper holder 1105, a wire 1107, a bobbin and coil 1109, a yoke 1111, a magnet 1113, a lower holder 1115, a film 1117, a housing 1119, and a substrate 1121.

The magnet 1113 and the bobbin and coil 1109 may move the lens 1101 of the camera module 1100 in the vertical direction. For example, the lens 1101 may be inserted into the interior of the bobbin and coil 1109 and may move in a specified direction (e.g., vertical direction) in response to the movement of the bobbin and coil 1109. According to an embodiment, if a current of a specified magnitude is supplied to the bobbin and coil 1109, since the electric field due to the current flowing in the coil generates a repulsive force corresponding to the magnetic field of the magnet 1113, the camera module 1100 may move the bobbin and coil 1109 in a specified direction. The amount of current supplied to the bobbin and coil 1109 may vary depending to the variation in the focus location changed in response to a user input. Alternatively, the amount of current supplied to the bobbin and coil 1109 may vary depending on the characteristic of the camera module 1100. For example, in the case of a camera module, the first focus sharpness variation of which is set to a first unit movement, the amount of current supplied to the bobbin and coil 1109 may increase or decrease at the magnitude corresponding to the first unit movement in response to a user input. Alternatively, in the case of a camera module, the second focus sharpness variation of which is set to a second unit movement, the amount of current supplied to the bobbin and coil 1109 may increase or decrease at the magnitude corresponding to the second unit movement in response to a user input. Herein, an electronic device including the camera module may allow the first focus sharpness variation to be the same as the second focus sharpness variation with respect to a user input of the same magnitude. For example, a processor may set the first unit movement amount and the second unit movement amount differently from each other to allow camera modules to have the same focus sharpness variation with respect to a user input (e.g., the same touch movement distance) of the same magnitude.

Figure 12:
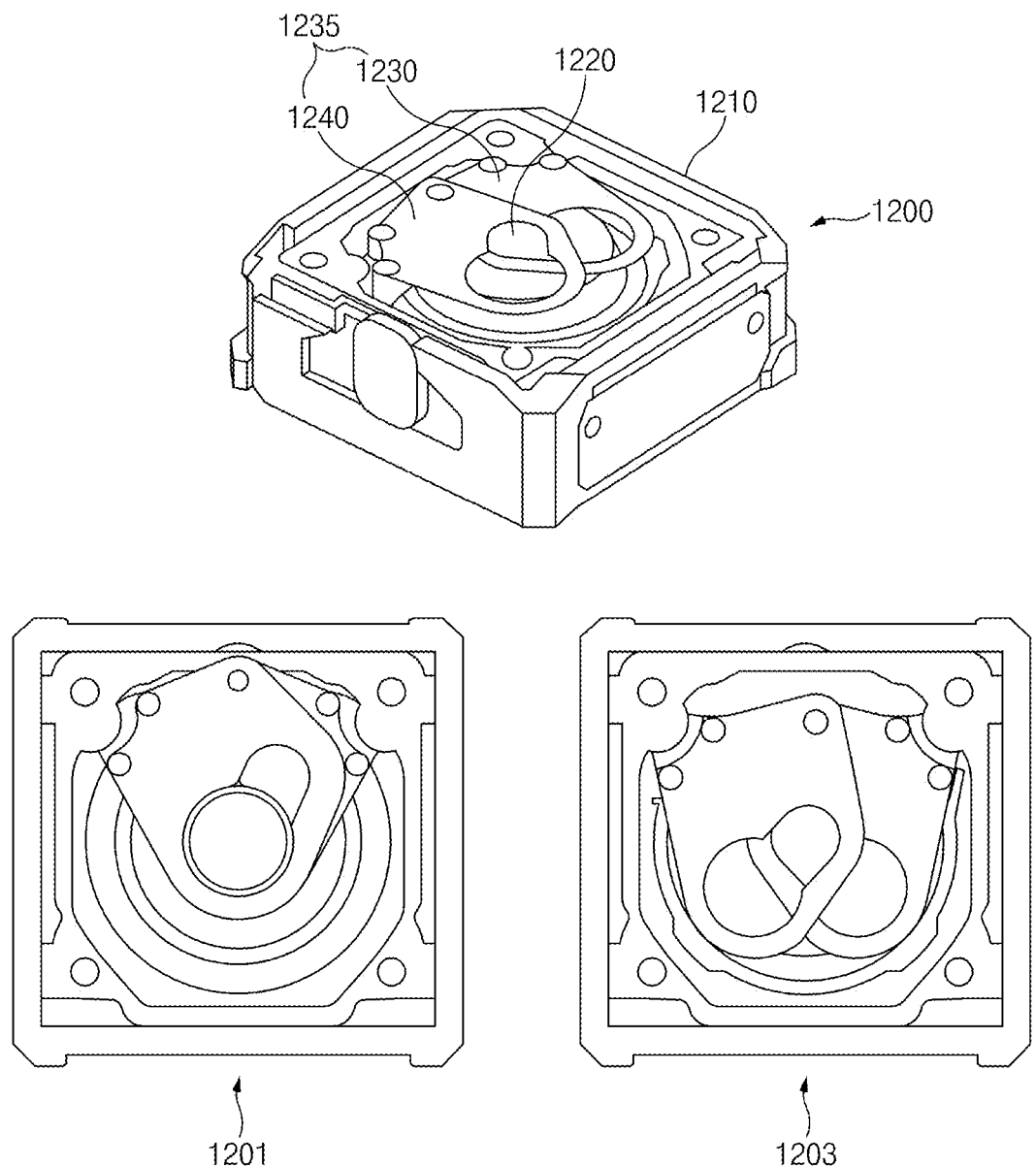
FIG. 12 illustrates a camera module including an aperture, according to various embodiment of the present disclosure.

FIG. 12 illustrates a camera module including an aperture, according to at least one embodiment of the present disclosure.

Referring to the non-limiting example of FIG. 12, a camera module 1200 according to certain embodiments of the present disclosure may be a small camera module which includes an aperture and which is capable of being inserted into a smartphone. The above-described camera module 1200 may include a case 1210 in which a lens 1220 is seated, and an aperture 1235 may be disposed in the upper portion of the lens 1220. Since the smartphone is in various embodiments, manufactured to be structurally thin, the height of the camera module may be limited. As such, as shown in FIG. 12, the aperture 1235 may include a first wing 1230 and a second wing 1240 each of which is fixed to one side of the case of the camera module 1200. The first wing 1230 and the second wing 1240 may include a snowman-shaped hole including a plurality of circles (e.g., a first circle and a second circle), the centers of which are different from each other and the outer peripheries of which are at least partially overlapped with each other. The aperture 1235 may include a first aperture state 1201, which is formed while the first circle (e.g., having a diameter greater than the diameter of a second circle) of the first wing 1230 and the first circle of the second wing 1240 are overlapped with each other, and a second aperture state 1203 formed while the second circle of the first wing 1230 and the second circle of the second wing 1240 are overlapped with each other. As described above, the first aperture state and second aperture state may correspond to specific values of f-numbers, respectively.

The electronic device 100 may, in certain embodiments, include a plurality of camera modules each of which includes the above-mentioned aperture. For example, the camera modules may have different angles of coverage (e.g., wide-angle and telephoto), respectively. A plurality of camera modules each of which includes an aperture may be disposed adjacent to each other.

With regard to focus location application of the plurality of camera modules each of which includes an aperture, the processor 520 may use the above-described aperture state change. For example, in a state where the first camera module has a first focus location, if the first camera module is deactivated while the second camera module is activated, in a process to applying the first focus location to the second camera module, the processor 520 may be configured to maintain the focus movement amount of the second camera module as a specified default value, to change an aperture state to the first aperture state 1201 or the second aperture state 1203, and to have a sharpness variation the same as a first focus sharpness variation. For example, the default value may include a focus location value in a state where a focus location indicator is disposed at the center (or the lowermost end or the uppermost end of a focus stroke area, or the like) of a focus stroke area.

Figure 13:
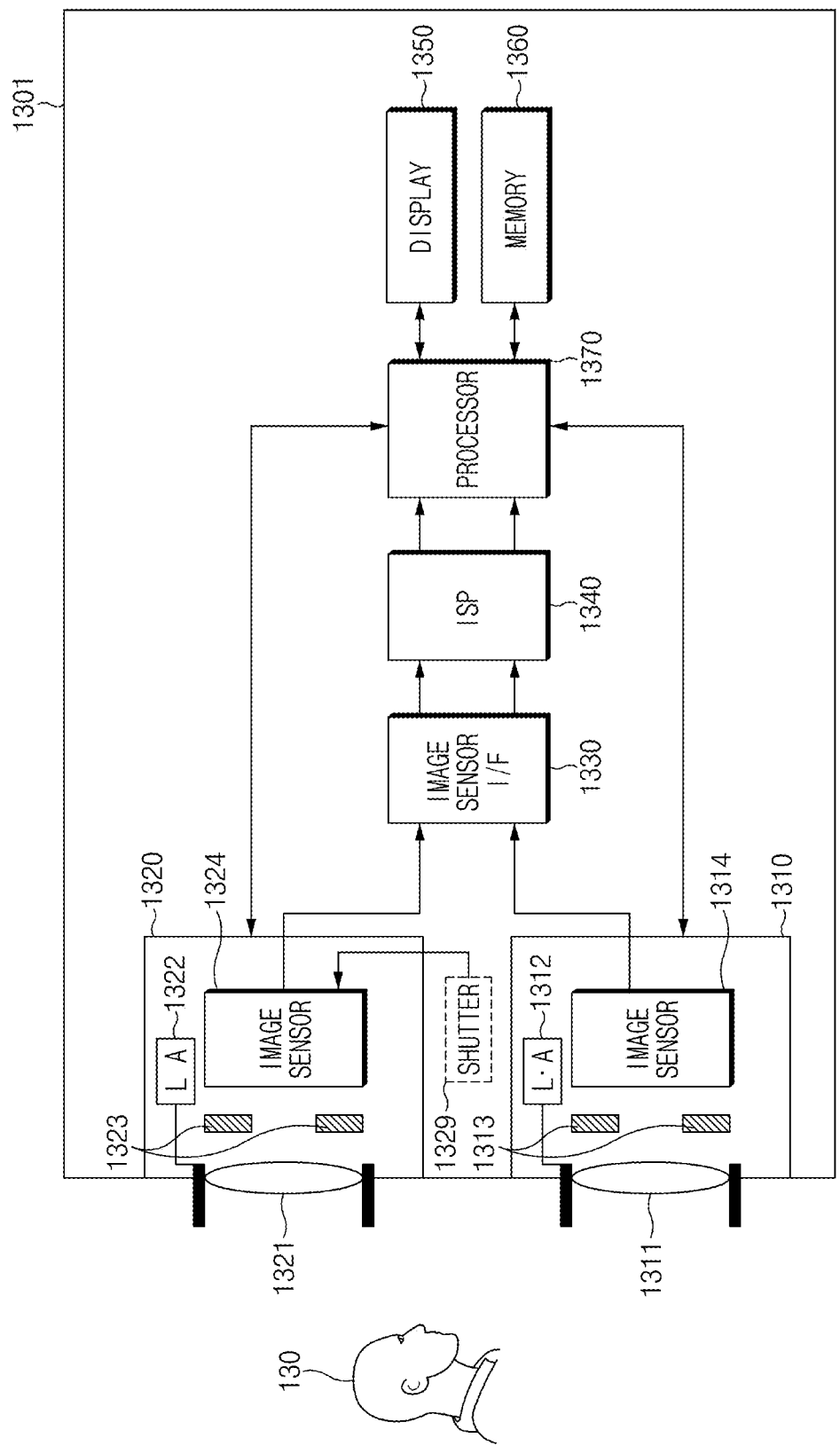
FIG. 13 illustrates, in block diagram format, an electronic device including a plurality of camera modules, according to at least one embodiment of the present disclosure.

FIG. 13 illustrates, in block diagram format, an example of an electronic device including a plurality of camera modules, according to certain embodiments of the present disclosure.

Referring to the non-limiting example of FIG. 13, an electronic device 1301 according to some embodiments may include a first camera module 1310, a second camera module 1320, an image sensor interface (I/F) 1330, an image signal processor (hereinafter refer to as an "ISP") 1340, a display 1350, a memory 1360, and a processor 1370. According to various embodiments, the electronic device 1301 may be implemented without some elements or may be implemented to further include one or more elements not illustrated in FIG. 13. The electronic device 1301 may include apertures having a plurality of f-numbers based at least part on a portable case of a specific size.

The first camera module 1310 may include a first lens 1311, a first actuator 1312, a diaphragm or aperture 1313, and a first image sensor 1314. According to various embodiments, the first camera module 1310 may be implemented without some elements or may be implemented to further include one element (e.g., an OIS module, a flash, or the like) not illustrated.

The first lens 1311 may focus light incident on the camera 1310 from the outside. The focused light may reach the first image sensor 1314 through the aperture 1313. That is, the first lens 1311 may allow light reflected by a subject or light produced from the subject to reach a pixel array of the first image sensor 1314.

The first actuator 1312 may drive the first lens 1311 under control of the processor 1370. The first actuator 1312 may support the manual focus adjustment of a subject 130, by moving the first lens 1311. The first actuator 1312 may include a servo motor or an ultrasonic motor. According to various embodiments, the first actuator 1312 may be referred to as a "lens actuator", "auto focus (AF) actuator", or the like.

The aperture 1313 may adjust the amount of light (the intensity of radiation) reaching (or incident on) the first image sensor 1314. Generally, as the aperture is opened widely, the amount of light reaching the first image sensor 1314 may increase (increase effective diameter); as the aperture is closed, the amount of light reaching the first image sensor 1314 may decrease (decrease effective diameter). According to some embodiments, the aperture value of the aperture 1313 may be automatically adjusted by the focus location value of the camera module previously executed.

The first image sensor 1314 may include the pixel array in which a plurality of pixels are two-dimensionally arranged in a lattice shape. The pixel array may include millions or tens of millions of pixels, and one of a plurality of predetermined colors may be allocated to each of the pixels. For example, the plurality of predetermined colors may include "red, green, and blue (RGB)". The first image sensor 1314 may be implemented using charge-coupled device (CCD) or complementary metal-oxide-semiconductor (CMOS), for example.

According to various embodiments, the first image sensor 1314 may generate an electrical signal based at least partly on light received from the outside and may generate digital image (e.g., Bayer image) based at least partly on the electrical signal. The image generated by the first image sensor 1314 may be transmitted to the image sensor interface 1330.

For example, under control of the processor 1370, a shutter 1319 may adjust a time when the first image sensor 1314 is exposed to light. For example, if the shutter 1319 operates slowly, the large amount of light may be incident on the first image sensor 1314; if the shutter 1319 operates quickly, the small amount of light may be incident on the first image sensor 1314. A time when the shutter 1319 operates may be determined depending on a shutter speed set automatically or manually. The shutter 1319 may include a mechanical shutter or an electronic shutter of a way to control an image sensor.

The second camera module 1320 may include a configuration the same as or similar to that of the first camera module 1310. The second camera module 1320 may include a second lens 1321, a second actuator 1322 that drives the second lens 1321, an aperture 1323, and a second image sensor 1324. The FoV of the first camera module 1310 and the FoV of the second camera module 1320 has a common portion within a specific range, and a specific camera module may have a greater FoV.

The description of the second camera module 1320 will be replaced with the description of the first camera module 1310. However, according to certain embodiments, the design specifications of each of elements included in the second camera module 1320 may be different from the design specifications of each of elements included in the first camera module 1310. For example, a focal length of each of the first lens 1311 and the second lens 1321, the number of pixels of each of the first image sensor 1314 and the second image sensor 1324, the pitch of each pixel, or the like may have a different value.

The image sensor interface (I/F) 1330 may mediate data exchange between the image sensor 1314 and another element (e.g., the ISP 1340). For example, the image sensor interface 1330 may transmit the image data generated the first image sensor 1314 or the second image sensor 1324, to the ISP 1340.

The ISP 1340 may include a plurality of image processing blocks (hereinafter referred to as "IP blocks"). The ISP 1340 may correct the image obtained from the first camera module 1310 or the second camera module 1320 through the plurality of IP blocks. For example, the IP blocks may include various IP blocks such as an IP block for color interpolation, an IP block for lens shading correction, an IP block for auto white balance, an IP block for lateral chromatic aberration correction, an IP block for optical inverse correction, an IP block for noise reduction, an IP block for edge enhancement, an IP block for gamma correction, or an IP block for out of focusing (or shallow depth of field). The plurality of IP blocks may be also referred to as an "image processing filter", an "image processing module", or the like. Also, according to various embodiments, the ISP 1340 may be included in the processor 1370.

The display 1350 may visibly output various content (e.g., a text, an image, a video, an icon, a widget, a symbol, or the like) to a user. For example, the display 1350 may be configured to output the image received from the first camera module 1310. In the case where the image generated by the first camera module 1310 is output to the display 1350 in real time, the output of the corresponding image may be referred to as a so-called "Live view". According to some embodiments, the display 1350 may include a touch panel.

As such, the display 1350 may sense a touch, gesture, proximity, or hovering input using an electronic pen or a part of a user's body.

The memory 1360 may include a volatile and/or nonvolatile memory. The memory 1360 may store various types of commands or data associated with elements 1310 to 1350, and 1370 included in the electronic device 1301. For example, the memory 1360 may store instructions, when executed, that cause the processor 1370 to perform various operations described in the present disclosure. After the instructions are implemented with, for example, software such as an application program, an operating system (OS), or firmware, the instructions may be stored in the memory 1360 or may be embedded in hardware.

The processor 1370 may be electrically connected with the elements 1310 to 1360 included in the electronic device 1301 to perform operations associated with control and/or communication of the elements 1310 to 1360 included in the electronic device 1301.

As with the above-described processors 120 and 520, the processor 1370 may support the focus location adjustment of camera modules and the output of a focus manipulation object. For example, while the state of the first camera module 1310 (e.g., the first camera module 210) is transitioned from an activation state to a deactivation state, in the case where the second camera module 1320 (e.g., the second camera module 220) is activated, the processor 1370 may apply the focus location value of the first camera module 1310 to the second camera module 1320. In this process, the processor 1370 may apply the focus manipulation object associated with the focus location adjustment of the first camera module 1310, to the second camera module 1320. The update of the focus manipulation object may follow the method described in FIG. 9 or the like. If an aperture value is adjusted, the processor 1370 may adjust the display part length of a focus stroke according to manual focus manipulation, in association with an adjusted aperture value. For example, even though an aperture value is changed, the processor 1370 may allow the focus sharpness variation manipulated depending on a user touch distance to be standardized.

As described above, the processor 1370 of an electronic device may be configured to adjust a first unit (e.g., a focus unit distance defined by the first focus sharpness variation) of the first camera module 1310 or a second unit (e.g., a focus unit distance defined by the second focus sharpness variation) of the second camera module 1320 such that a difference between a first focus sharpness variation associated with the first camera module 1310 and a second focus sharpness variation associated with the second camera module 1320 is reduced, based at least on a first f-number corresponding to a first lens driving part associated with the focus adjustment of the first camera module 1310 or a second f-number corresponding to the second lens driving part associated with the focus adjustment of the second camera module 1320.

According to various embodiments, the processor 1370 may be configured to adjust at least one of the first unit or the second unit such that a difference between the first focus sharpness variation and the second focus sharpness variation is reduced, based at least on the first sensitivity of a focus lens corresponding to the first lens driving part or the second sensitivity of a focus lens corresponding to the second lens driving part.

According to various embodiments, the processor 1370 may be configured to adjust the first unit or the second unit based at least partly on the depth of the external object (or a subject) from the first camera module 1310 or the second camera module 1320.

Figure 14:
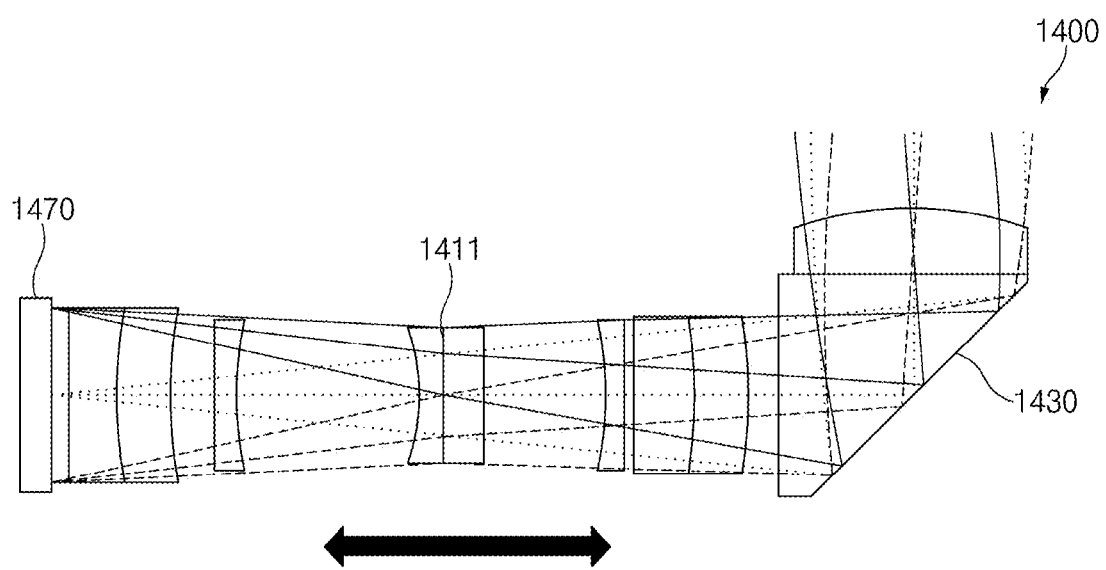
FIG. 14 illustrates an example of a reflection-type camera module having a plurality of focal lengths, according to certain embodiments of the present disclosure.

FIG. 14 illustrates a camera module, according to various embodiments of the present disclosure.

Referring to the non-limiting example of FIG. 14, a camera module 1400 according to some embodiment of the present disclosure may include an image sensor 1470, a focus lens 1411, and a prism lens 1430. Additionally, the camera module 1400 may further include a housing surrounding the image sensor 1470, the focus lens 1411, and the prism lens 1430, and may further include a focus lens driving part capable of moving the focus lens 1411 back and forth in the housing. The camera module 1400 of the configuration may be disposed in at least one of the above-described other camera modules (e.g., wide-angle camera module or telephoto camera module) and one electronic device. As such, the camera module 1400 in the form in which the focus lens 1411 is capable of moving in the housing may adjust the focus lens 1411 in response to a user input under control (or the control of an ISP or the like that performs the operation control of a camera module) of the processor in an electronic device. In this regard, the processor of the electronic device may output a user interface including a focus manipulation object for receiving a user input associated with the distance adjustment of the focus lens 1411. When another camera module (e.g., a wide-angle camera module, a telephoto camera module, or the like) is operated, the user interface may be updated with regard to the focus location adjustment of the corresponding camera module.

As described above, an electronic device according to certain embodiments of the present disclosure may allow camera modules to have focus sharpness variation of the same magnitude in association with an input signal of the same magnitude in terms of user input with regard to camera modules of various forms, even though focus sharpness variations are different from each other, and thus may present the standardized user interface in association with a focus location change.

According to various embodiments, an electronic device includes a camera. The camera may include a plurality of lens, a first driving unit (e.g., the first lens driving part) moving at least part of the plurality of lenses by a unit movement amount for the purpose of controlling a focus of the camera, a second driving unit (e.g., the second lens driving part) moving at least part of the plurality of lenses for the purpose of controlling the magnification of the camera, a light path changing unit formed the middle of a light path of the plurality of lenses and changing the light path, and a processor (e.g., the processor 520). The processor may be configured to verify a first focus sharpness variation corresponding to a first unit movement amount of the first driving unit with respect to a first magnification of the camera, to verify a second focus sharpness variation corresponding to a first unit movement amount of the first driving unit with respect to a second magnification of the camera, to determine a difference between the first focus sharpness variation and the second focus sharpness variation if the magnification of the camera is changed from the first magnification to the second magnification, and to change the a first unit movement amount to a second unit movement amount based on the difference as the difference decreases.

Figure 15:
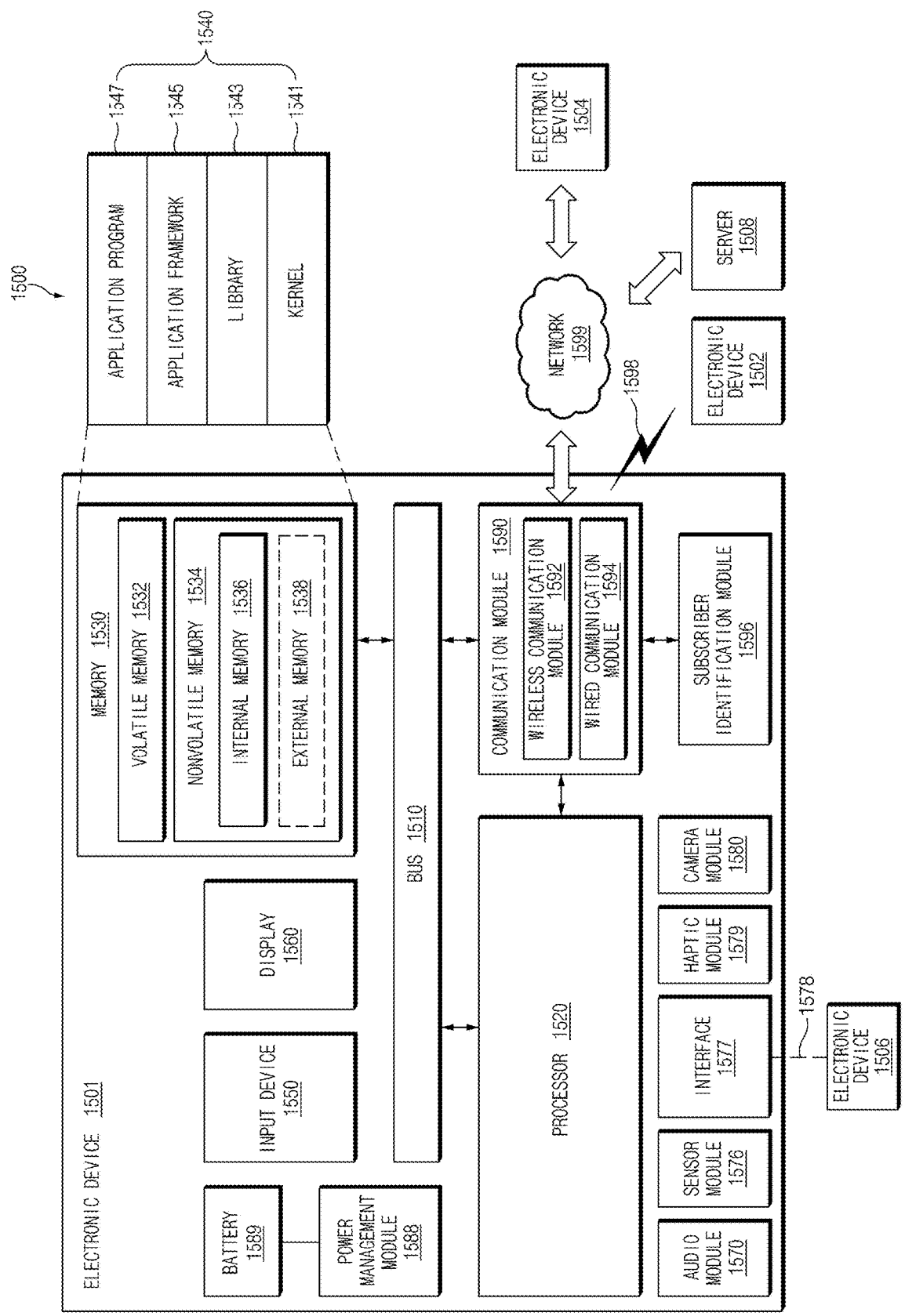
FIG. 15 illustrates, in block diagram format, a device in a network environment according to various embodiments of this disclosure.

FIG. 15 illustrates, in block diagram format, an electronic device 1501 in a network environment 1500, according to various embodiments.

Referring to the non-limiting example of FIG. 15, in the network environment 1500, the electronic device 1501 (e.g., the electronic device 100) may communicate with an electronic device 1502 through local wireless communication module 1598 or may communicate with an electronic device 1504 or a server 1508 through a network 1599. According to an embodiment, the electronic device 1501 may communicate with the electronic device 1504 through the server 1508.

According to certain embodiments, the electronic device 1501 may include a bus 1510, a processor 1520 (e.g., the processor 120 or 520) a memory 1530, an input device 1550 (e.g., a micro-phone or a mouse), a display 1560, an audio module 1570, a sensor module 1576, an interface 1577, a haptic module 1579, a camera module 1580, a power management module 1588, a battery 1589, a communication module 1590, and a subscriber identification module 1596. According to various embodiments, the electronic device 1501 may not include at least one (e.g., the display 1560 or the camera module 1580) of the above-described elements or may further include other element(s).

For example, the bus 1510 may interconnect the above-described elements 1520 to 1590 and may include a circuit for conveying signals (e.g., a control message or data) between the above-described elements. The processor 1520 may include one or more of a central processing unit (CPU), an application processor (AP), a graphic processing unit (GPU), an image signal processor (ISP) of a camera or a communication processor (CP). According to an embodiment, the processor 1520 may be implemented with a system on chip (SoC) or a system in package (SiP). For example, the processor 1520 may drive an operating system (OS) or an application to control at least one of another element (e.g., hardware or software element) connected to the processor 1520 and may process and compute various data. The processor 1520 may load a command or data, which is received from at least one of other elements (e.g., the communication module 1590), into a volatile memory 1532 to process the command or data and may store the process result data into a nonvolatile memory 1534.

The memory 1530 may include, for example, the volatile memory 1532 or the nonvolatile memory 1534. The volatile memory 1532 may include, for example, a random access memory (RAM) (e.g., a dynamic RAM (DRAM), a static RAM (SRAM), or a synchronous dynamic RAM (SDRAM)). The nonvolatile memory 1534 may include, for example, a one-time programmable read-only memory (OT-PROM), a programmable read-only memory (PROM), an erasable programmable read-only memory (EPROM), an electrically erasable programmable read-only memory (EE-PROM), a mask ROM, a flash ROM, a flash memory, a hard disk drive, or a solid-state drive (SSD). In addition, the nonvolatile memory 1534 may be configured in the form of an internal memory 1536 or the form of an external memory 1538 which is available through connection only if necessary, according to the connection with the electronic device 1501. The external memory 1538 may further include a flash drive such as compact flash (CF), secure digital (SD), micro secure digital (Micro-SD), mini secure digital (Mini-SD), extreme digital (xD), a multimedia card (MMC), or a memory stick. The external memory 1538 may be operatively or physically connected with the electronic device 1501 in a wired manner (e.g., a cable or a universal serial bus (USB)) or a wireless (e.g., Bluetooth) manner.

For example, the memory 1530 may store, for example, at least one different software element, such as an instruction or data associated with the program 1540, of the electronic device 1501. The program 1540 may include, for example, a kernel 1541, a library 1543, an application framework 1545 or an application program (interchangeably, "application") 1547.

The input device 1550 may include a microphone, a mouse, or a keyboard. According to an embodiment, the keyboard may include a keyboard physically connected or a keyboard virtually displayed through the display 1560.

The display 1560 may include a display, a hologram device or a projector, and a control circuit to control a relevant device. The screen may include, for example, a liquid crystal display (LCD), a light emitting diode (LED) display, an organic LED (OLED) display, a microelectromechanical systems (MEMS) display, or an electronic paper display. According to an embodiment, the display may be flexibly, transparently, or wearably implemented. The display may include a touch circuitry, which is able to detect a user's input such as a gesture input, a proximity input, or a hovering input or a pressure sensor (interchangeably, a force sensor) which is able to measure the intensity of the pressure by the touch. The touch circuit or the pressure sensor may be implemented integrally with the display or may be implemented with at least one sensor separately from the display. The hologram device may show a stereoscopic image in a space using interference of light. The projector may project light onto a screen to display an image. The screen may be located inside or outside the electronic device 1501.

The audio module 1570 may convert, for example, from a sound into an electrical signal or from an electrical signal into the sound. According to an embodiment, the audio module 1570 may acquire sound through the input device 1550 (e.g., a microphone) or may output sound through an output device (not illustrated) (e.g., a speaker or a receiver) included in the electronic device 1501, an external electronic device (e.g., the electronic device 1502 (e.g., a wireless speaker or a wireless headphone)) or an electronic device 1506 (e.g., a wired speaker or a wired headphone) connected with the electronic device 1501

The sensor module 1576 may measure or detect, for example, an internal operating state (e.g., power or temperature) or an external environment state (e.g., an altitude, a humidity, or brightness) of the electronic device 1501 to generate an electrical signal or a data value corresponding to the information of the measured state or the detected state. The sensor module 1576 may include, for example, at least one of a gesture sensor, a gyro sensor, a barometric pressure sensor, a magnetic sensor, an acceleration sensor, a grip sensor, a proximity sensor, a color sensor (e.g., a red, green, blue (RGB) sensor), an infrared sensor, a biometric sensor (e.g., an iris sensor, a fingerprint senor, a heartbeat rate monitoring (FIRM) sensor, an e-nose sensor, an electromyography (EMG) sensor, an electroencephalogram (EEG) sensor, an electrocardiogram (ECG) sensor, a temperature sensor, a humidity sensor, an illuminance sensor, or an UV sensor. The sensor module 1576 may further include a control circuit for controlling at least one or more sensors included therein. According to an embodiment, the sensor module 1576 may be controlled by using the processor 1520 or a processor (e.g., a sensor hub) separate from the processor 1520. In the case that the separate processor (e.g., a sensor hub) is used, while the processor 1520 is in a sleep state, the separate processor may operate without awakening the processor 1520 to control at least a portion of the operation or the state of the sensor module 1576.

According to some embodiments, the interface 1577 may include a high definition multimedia interface (HDMI), a universal serial bus (USB), an optical interface, a recommended standard 232 (RS-232), a D-subminiature (D-sub), a mobile high-definition link (MHL) interface, a SD card/MMC interface, or an audio interface. A connector 1578 may physically connect the electronic device 1501 and the electronic device 1506. According to an embodiment, the connector 1578 may include, for example, an USB connector, an SD card/MMC connector, or an audio connector (e.g., a headphone connector).

The haptic module 1579 may convert an electrical signal into mechanical stimulation (e.g., vibration or motion) or into electrical stimulation. For example, the haptic module 1579 may apply tactile or kinesthetic stimulation to a user. The haptic module 1579 may include, for example, a motor, a piezoelectric element, or an electric stimulator.

The camera module 1580 may capture, for example, a still image and a moving picture. According to an embodiment, the camera module 1580 may include at least one lens (e.g., a wide-angle lens and a telephoto lens, or a front lens and a rear lens), an image sensor, an image signal processor, or a flash (e.g., a light emitting diode or a xenon lamp).

The power management module 1588, which is to manage the power of the electronic device 1501, may constitute at least a portion of a power management integrated circuit (PMIC).

The battery 1589 may include a primary cell, a secondary cell, or a fuel cell and may be recharged by an external power source to supply power at least one element of the electronic device 1501.

The communication module 1590 may establish a communication channel between the electronic device 1501 and an external device (e.g., the first external electronic device 1502, the second external electronic device 1504, or the server 1508). The communication module 1590 may support wired communication or wireless communication through the established communication channel. According to an embodiment, the communication module 1590 may include a wireless communication module 1592 or a wired communication module 1594. The communication module 1590 may communicate with the external device (e.g., the first external electronic device 1502, the second external electronic device 1504 or the server 1508) through a first network 1598 (e.g. a wireless local area network such as Bluetooth or infrared data association (IrDA)) or a second network 1599 (e.g., a wireless wide area network such as a cellular network) through a relevant module among the wireless communication module 1592 or the wired communication module 1594.

The wireless communication module 1592 may support, for example, cellular communication, local wireless communication, and global navigation satellite system (GNSS) communication. The cellular communication may include, for example, long-term evolution (LTE), LTE Advance (LTE-A), code division multiple access (CMA), wideband CDMA (WCDMA), universal mobile telecommunications system (UMTS), wireless broadband (WiBro), or global system for mobile communications (GSM). The local wireless communication may include wireless fidelity (Wi-Fi), Wi-Fi Direct, light fidelity (Li-Fi), Bluetooth, Bluetooth low energy (BLE), Zigbee, near field communication (NFC), magnetic secure transmission (MST), radio frequency (RF), or a body area network (BAN). The GNSS may include at least one of a global positioning system (GPS), a global navigation satellite system (Glonass), Beidou Navigation Satellite System (Beidou), the European global satellite-based navigation system (Galileo), or the like. In the present disclosure, "GPS" and "GNSS" may be interchangeably used.

According to certain embodiments, when the wireless communication module 1592 supports cellar communication, the wireless communication module 1592 may, for example, identify or authenticate the electronic device 1501 within a communication network using the subscriber identification module (e.g., a SIM card) 1596. According to an embodiment, the wireless communication module 1592 may include a communication processor (CP) separate from the processor 2820 (e.g., an application processor (AP). In this case, the communication processor may perform at least a portion of functions associated with at least one of elements 1510 to 1596 of the electronic device 1501 in substitute for the processor 1520 when the processor 1520 is in an inactive (sleep) state, and together with the processor 1520 when the processor 1520 is in an active state. According to some embodiments, the wireless communication module 1592 may include a plurality of communication modules, each supporting only a relevant communication scheme among cellular communication, short-range wireless communication, or a GNSS communication scheme.

The wired communication module 1594 may include, for example, include a local area network (LAN) service, a power line communication, or a plain old telephone service (POTS).

For example, the first network 1598 may employ, for example, Wi-Fi direct or Bluetooth for transmitting or receiving instructions or data through wireless direct connection between the electronic device 1501 and the first external electronic device 1502. The second network 1599 may include a telecommunication network (e.g., a computer network such as a LAN or a WAN, the Internet or a telephone network) for transmitting or receiving instructions or data between the electronic device 1501 and the second electronic device 1504.

According to certain embodiments, the instructions or the data may be transmitted or received between the electronic device 1501 and the second external electronic device 1504 through the server 1508 connected with the second network. Each of the external first and second external electronic devices 1502 and 1504 may be a device of which the type is different from or the same as that of the electronic device 1501. According to various embodiments, all or a part of operations that the electronic device 1501 will perform may be executed by another or a plurality of electronic devices (e.g., the electronic devices 1502 and 1504 or the server 1508). According to at least one embodiment, in the case that the electronic device 1501 executes any function or service automatically or in response to a request, the electronic device 1501 may not perform the function or the service internally, but may alternatively or additionally transmit requests for at least a part of a function associated with the electronic device 1501 to any other device (e.g., the electronic device 1502 or 1504 or the server 1508). The other electronic device (e.g., the electronic device 1502 or 1504 or the server 1508) may execute the requested function or additional function and may transmit the execution result to the electronic device 1501. The electronic device 1501 may provide the requested function or service using the received result or may additionally process the received result to provide the requested function or service. To this end, for example, cloud computing, distributed computing, or client-server computing may be used.

The term "module" used herein encompasses a unit, which is implemented with hardware, software, or firmware, and may be interchangeably used with the terms "logic", "logical block", "component", "circuit", or the like. The "module" may be a minimum unit of an integrated component or a part thereof or may be a minimum unit for performing one or more functions or a part thereof. The "module" may be implemented mechanically or electronically and may include, for example, an application-specific IC (ASIC) chip, a field-programmable gate array (FPGA), and a programmable-logic device for performing some operations, which are known or will be developed.

According to various embodiments, at least a part of an apparatus (e.g., modules or functions thereof) or a method (e.g., operations) may, for example, be implemented by instructions stored in a computer-readable storage media in the form of a program module. The instruction, when executed by a processor (e.g., a processor 120, 520, or 1370), may cause the processor to perform a function corresponding to the instruction. The computer-readable recording medium may be, for example, a memory (e.g., the memory 140 or 1360).

The computer-readable recording medium may include a hard disk, a floppy disk, a magnetic media (e.g., a magnetic tape), an optical media (e.g., a compact disc read only memory (CD-ROM) and a digital versatile disc (DVD), a magneto-optical media (e.g., a floptical disk)), an embedded memory, and the like. The one or more instructions may contain a code made by a compiler or codes executable by an interpreter. The above hardware unit may be configured to operate as one or more software modules to perform an operation according to various embodiments, and vice versa.

Modules or program modules according to various embodiments may include at least one or more of the above-mentioned elements, some of the above-mentioned elements may be omitted, or other additional elements may be further included therein. Operations executed by modules, program modules, or other elements according to various embodiments may be executed by a successive method, a parallel method, a repeated method, or a heuristic method. In addition, a part of operations may be executed in different sequences or may be omitted. Alternatively, other operations may be added.

Although the present disclosure has been described with various embodiments, various changes and modifications may be suggested to one skilled in the art. It is intended that the present disclosure encompass such changes and modifications as fall within the scope of the appended claims.

What is claimed is:

1. An electronic device comprising:
    a first camera module including a first lens driving part configured to move according to a first unit, wherein movement of the first lens driving part causes a first focus sharpness variation;
    a second camera module including a second lens driving part configured to move according to a second unit, wherein movement of the second lens driving part causes a second focus sharpness variation, wherein the first focus sharpness variation based on a first distance movement of the first lens driving part is different than the second focus sharpness variation based on a second distance movement of the second lens driving part, and wherein the first distance movement matches the second distance movement;
    a memory; and
    a processor,
    wherein the processor is configured to:
        receive a request to execute a camera function,
        receive a signal for adjusting a focus associated with an external object by using the first camera module or the second camera module, in response to the request to execute the camera function,
        adjust the first unit or the second unit such that a difference between the first focus sharpness variation and the second focus sharpness variation belongs within a specified range, and
        move the first lens driving part based on the adjusted first unit or the second lens driving part based on the adjusted second unit to adjust the focus associated with the external object.

2. The electronic device of claim 1, wherein the processor is configured to:
    adjust the first unit or the second unit such that the first focus sharpness variation and the second focus sharpness variation are substantially equal to each other.

3. The electronic device of claim 1, wherein the processor is configured to:
    adjust the first unit or the second unit based at least partly on a first f-number corresponding to the first lens driving part or a second f-number corresponding to the second lens driving part, to reduce the difference between the first focus sharpness variation and the second focus sharpness variation.

4. The electronic device of claim 1, wherein the processor is configured to:
    adjust the first unit or the second unit so as to reduce the difference between the first focus sharpness variation and the second sharpness variation, based at least partly on a first sensitivity corresponding to the first lens driving part or a second sensitivity corresponding to the second lens driving part.

5. The electronic device of claim 1, wherein the processor is configured to:
    adjust the first unit or the second unit based on depth associated with the external object from the first camera module or the second camera module.

6. The electronic device of claim 1, wherein the processor is configured to:
    receive an external input through a controller for adjusting the focus; and
    move the first lens driving part or the second lens driving part based on a corresponding adjusted unit among the adjusted first unit and the adjusted second unit to adjust the focus, in response to the external input.

7. The electronic device of claim 6, wherein the processor is configured to:
    present the controller through a display operatively connected to the electronic device.

8. The electronic device of claim 7, wherein the processor is configured to:
    change a form of the controller based at least partly on the adjustment.

9. An electronic device comprising:
    a camera including a lens driving part, the lens driving part comprising a first lens driving part and a second lens driving part;
    a memory configured to store first unit information and second unit information, which are used to move the lens driving part, wherein the first unit information is configured such that the camera causes a first focus sharpness variation and the second unit information is configured such that the camera causes a second focus sharpness variation, wherein the first focus sharpness variation based on a first distance movement of the first lens driving part is different than the second focus sharpness variation based on a second distance movement of the second lens driving part, and wherein the first distance movement matches the second distance movement; and a processor,
wherein the processor is configured to:
receive a signal for adjusting a focus associated with an external object by using the camera,
verify a state of the electronic device associated with the received signal,
select corresponding unit information among the first unit information and the second unit information, based at least partly on the state of the electronic device, and
move the lens driving part based on the corresponding unit information to adjust the focus associated with the external object.

10. The electronic device of claim 9, wherein the first lens driving part is driven according to a first unit and the second lens driving part is driven according to a second unit, and wherein the processor is configured to:
adjust the first unit or the second unit such that the first focus sharpness variation and the second focus sharpness variation are substantially equal to each other;
adjust the first unit or the second unit so as to reduce a difference between the first focus sharpness variation and the second focus sharpness variation, based at least partly on a first f-number corresponding to the first lens driving part or a second f-number corresponding to the second lens driving part;
adjust the first unit or the second unit so as to reduce the difference between the first focus sharpness variation and the second focus sharpness variation, based at least partly on a first sensitivity corresponding to the first lens driving part or a second sensitivity corresponding to the second lens driving part; and
adjust the first unit or the second unit based on depth associated with the external object from a first camera module or a second camera module.

11. The electronic device of claim 10, wherein the processor is configured to:
receive an external input through a controller for adjusting the focus; and
move the first lens driving part or the second lens driving part based on a corresponding adjusted unit among the adjusted first unit and the adjusted second unit to adjust the focus, in response to the external input.

12. The electronic device of claim 11, wherein the processor is configured to:
present the controller through a display operatively connected to the electronic device.

13. The electronic device of claim 12, wherein the processor is configured to:
change a form of the controller based at least partly on the adjustment.

14. An electronic device comprising:
a display;
a first camera module including a first lens module and a first lens driving part configured to move the first lens module in a first movement unit;
a second camera module including a second lens module and a second lens driving part configured to move the second lens module in a second movement unit; and
a processor electrically connected to the first camera module and the second camera module,
wherein the processor is configured to:
receive a user input with respect to one or more external objects, in a state where the first camera module is activated,
determine activation of the second camera module with respect to the one or more external objects, in response to the user input,
present a user interface controlled such that a difference between a first focus sharpness variation of the first camera module changed by a change of a focus of the first camera module and a second focus sharpness variation of the second camera module changed by a change of a focus of the second camera module belongs within a specified range, through the display based at least partly on the activation of the second camera module, and
upon operating a corresponding camera module among the first camera module and the second camera module, in association with a change of a focus location of the corresponding camera module, present a corresponding manipulation object among a first focus manipulation object having a first stroke area corresponding to the first camera module and a second focus manipulation object having a second stroke area corresponding to the second camera module, through the display.

15. The electronic device of claim 14, wherein one of the first camera module and the second camera module includes a wide-angle camera module, and
wherein the other of the first camera module and the second camera module includes a telephoto camera module.

16. The electronic device of claim 14, wherein the processor is configured to:
control the user interface such that the first focus sharpness variation is adjusted by a first touch distance associated with the first focus manipulation object and the second focus sharpness variation is adjusted by a second touch distance associated with the second focus manipulation object.

17. The electronic device of claim 14, wherein the processor is configured to:
during the activation of the first camera module, adjust the first movement unit of the first focus sharpness variation based at least partly on a first f-number corresponding to the first lens driving part; and
during the activation of the second camera module, adjust the second movement unit of the second focus sharpness variation based at least partly on a second f-number corresponding to the second lens driving part.

18. The electronic device of claim 14, wherein the processor is configured to:
during the activation of the first camera module, adjust the first movement unit of the first focus sharpness variation, based at least partly on a diameter of a first circle of confusion or first sensitivity corresponding to the first lens driving part; and
during the activation of the second camera module, adjust the second movement unit of the second focus sharpness variation, based at least partly on a diameter of a second circle of confusion or second sensitivity corresponding to the second lens driving part.

19. The electronic device of claim 14, wherein the processor is configured to:
adjust the first movement unit or the second movement unit based on depth associated with the one or more external objects from the first camera module or the second camera module.

* * * * *